(12) United States Patent
Vargo et al.

(10) Patent No.: US 6,232,386 B1
(45) Date of Patent: May 15, 2001

(54) POLYMER COMPOSITES HAVING AN OXYHALO SURFACE AND METHODS FOR MAKING SAME

(75) Inventors: Terrence G. Vargo, Kenmore; Timothy S. Koloski, West Amherst, both of NY (US)

(73) Assignee: Integument Technologies, Inc., Jamestown, NY (US)

( * ) Notice: Subject to any disclaimer, the term of this patent is extended or adjusted under 35 U.S.C. 154(b) by 0 days.

(21) Appl. No.: 08/997,012

(22) Filed: Dec. 23, 1997

Related U.S. Application Data

(63) Continuation-in-part of application No. 08/833,290, filed on Apr. 4, 1997, now Pat. No. 5,977,241.
(60) Provisional application No. 60/039,258, filed on Feb. 26, 1997.

(51) Int. Cl.[7] .............................. C08J 5/10; C08K 3/10; C08L 27/00
(52) U.S. Cl. .................. 524/434; 524/435; 524/436; 524/437; 524/403; 524/520; 524/544; 524/546; 521/61
(58) Field of Search ................... 524/430–441, 524/403, 520, 544, 546; 521/61

(56) References Cited

U.S. PATENT DOCUMENTS

| | | | |
|---|---|---|---|
| 4,381,918 | 5/1983 | Ehrnford | 433/199 |
| 4,865,925 | 9/1989 | Ludwing et al. | 429/12 |
| 4,957,961 | 9/1990 | Chandrasekaran et al. | 524/405 |
| 4,975,495 | * 12/1990 | Rosspoach et al. | 525/340 |
| 5,010,128 | 4/1991 | Coltrain et al. | 524/405 |
| 5,094,892 | 3/1992 | Kayihan | 427/440 |
| 5,112,529 | 5/1992 | Saito | 252/500 |
| 5,115,023 | 5/1992 | Basil et al. | 525/103 |
| 5,190,698 | 3/1993 | Coltrain et al. | 252/518 |

(List continued on next page.)

FOREIGN PATENT DOCUMENTS

| | | |
|---|---|---|
| 42 02 320 | 8/1993 | (DE) . |
| WO 94/18264 | 8/1994 | (WO) . |

OTHER PUBLICATIONS

Clarke et al., "Photochemical Generationa of Polymer–Bound CpMn (CO)2(n2–C=C) Complexes in Polyethylene Film: A Diagnostic Probe for Investigating the Unsaturation of the Polymer," *J. Am. Chem. Soc.*, 116:8621–8628 (1994).

Howdle et al., "Spectroscopic Analysis and In Situ Monitoring of Impregnation and Extraction of Polymer Films and Powders Using Supercritical Fluids," *Journal of Polymer Science: Part B: Polymer Physics*, 33:541–549 (1994).

Watkins et al., "Polymerization in Supercritical Fluid–Swollen Polymers: A New route to Polymer Blends," *Macromolecules*, 27:4845–4847 (1994).

MacDiarmid et al., "Application of Thin Films of conjugated Polymers in Novel LED's and Liquid Crystal Light Valves," *Proc. Materials Research Society Meeting*, Boston, MA (Nov. 1995).

Poliakoff et al., "Vibrational Spectroscopy in Supercritical Fluids: From Analysis and Hydrogen Bonding to Polymers and Synthesis," *Angew. Chem. Int. Ed. Engl.*, 34:1275–1295 (1995).

*Primary Examiner*—Samuel A. Acquah
*Assistant Examiner*—U K. Rajguru
(74) *Attorney, Agent, or Firm*—Braman & Rogalskyj, LLP

(57) ABSTRACT

Oxyhalopolymer composites which include an oxyhalopolymer having free volume therein and an inorganic or organic material disposed in the free volume of the oxyhalopolymer are disclosed. Also disclosed is a surface-oxyhalogenated non-halopolymer composite. The composite includes a surface-oxyhalogenated non-halopolymer having free volume therein and an inorganic or organic material disposed in the free volume of the surface-oxyhalogenated non-halopolymer. Methods for making and using these composites are also described.

42 Claims, 3 Drawing Sheets

U.S. PATENT DOCUMENTS

| | | | |
|---|---|---|---|
| 5,208,638 | 5/1993 | Bujese et al. | 355/274 |
| 5,217,828 | 6/1993 | Sangyoji et al. | 429/192 |
| 5,284,714 | 2/1994 | Anderson et al. | 428/474.5 |
| 5,334,292 | 8/1994 | Rajeshwar et al. | 204/59 R |
| 5,362,760 | 11/1994 | Bulters et al. | 521/54 |
| 5,366,544 | 11/1994 | Jones et al. | 106/187 |
| 5,380,584 | 1/1995 | Anderson et al. | 428/323 |
| 5,387,481 | 2/1995 | Radford et al. | 427/126.3 |
| 5,391,609 | 2/1995 | Knoerzer et al. | 524/497 |
| 5,405,583 | 4/1995 | Goswami et al. | 422/86 |
| 5,407,590 | 4/1995 | Salvia | 252/12 |
| 5,412,016 | 5/1995 | Sharp | 524/430 |
| 5,415,959 | 5/1995 | Pyszczek et al. | 429/249 |
| 5,420,313 | 5/1995 | Cunnington et al. | 549/529 |
| 5,439,785 | 8/1995 | Boston et al. | 430/530 |
| 5,468,498 | 11/1995 | Morrison et al. | 524/408 |
| 5,470,449 | 11/1995 | Bachot et al. | 204/252 |
| 5,474,857 | 12/1995 | Uchida et al. | 429/33 |
| 5,478,878 | 12/1995 | Nagaoka et al. | 524/430 |
| 5,492,769 | 2/1996 | Pryor et al. | 428/552 |
| 5,500,759 | 3/1996 | Coleman | 359/270 |
| 5,509,960 | 4/1996 | Simpson et al. | 106/437 |
| 5,512,389 | 4/1996 | Dasgupta et al. | 429/192 |
| 5,534,472 | 7/1996 | Winslow et al. | 502/116 |
| 5,536,583 | 7/1996 | Roberts et al. | 428/457 |
| 5,548,125 | 8/1996 | Sandbank | 250/519.1 |
| 5,627,079 * | 5/1997 | Gardella et al. | 436/525 |
| 5,977,241 * | 11/1999 | Koloski et al. | 524/502 |

* cited by examiner

POLYMER COMPOSITES HAVING AN OXYHALO SURFACE AND METHODS FOR MAKING SAME

The present application claims the benefit of U.S. Provisional patent Application Ser. No. 60/039,258, filed Feb. 26, 1997, a continuation-in-part of U.S. Pat. application Ser. No. 08/833,290, filed Apr. 4, 1997, now U.S. Pat. No. 5,977,241.

FIELD OF THE INVENTION

The present invention relates generally to composites, more particularly to oxyhalopolymer composites and surface-oxyhalogenated non-halopolymer composites, and to methods of making same.

BACKGROUND OF THE INVENTION

Inorganic-organic hybrid materials have been used with varying degrees of success for a variety of applications.

In some of these materials, organic polymers are blended with inorganic fillers to improve certain properties of those polymers or to reduce the cost of the polymeric compositions by substituting cheaper inorganic materials for more expensive organic materials. Typically, inorganic fillers are either particulate or fibrous and are derived from inexpensive materials, such as naturally occurring minerals and glass. For example, U.S. Pat. No. 5,536,583 to Roberts et al. ("Roberts") describes methods for mixing inorganic ceramic powders into polyethersulfones, polyether ketones, and polyether ether ketones and methods for including metal nitrides, oxides, and carbides into fluoropolymer resins to produce corrosion inhibiting coatings as well as coatings which have improved abrasion resistance and/or enhanced bonding characteristics. U.S. Pat. No. 5,492,769 to Pryor et al. ("Pryor") describes methods for embedding metal or ceramic materials into organic polymeric materials to increase the polymer's abrasion resistance. U.S. Pat. No. No. 5,478,878 to Nagaoka et al. ("Nagaoka") describes a thermoplastic blend of an organic polymer and inorganic metallic fillers which improves the polymer's resistance to discoloration upon exposure to ambient light sources.

Each of the above inorganic-organic hybrid materials were made either (1) by melting and then mixing the inorganic and organic phases into a homogeneous mixture which was then cured, extracted, or dried or (2) by dissolving the polymer and inorganic material together in a solvent in which both materials were miscible, mixing to produce a homogeneous solution, and then evaporating the solvent to extract the hybrid material. The resulting inorganic-organic hybrid materials are essentially homogeneous macromolecular blends which have separate inorganic and organic domains which range from nanometers to tens of micrometers in size. All of the above composites are fabricated by using inorganic materials, typically naturally occurring minerals, which are in thermodynamically stable metallic forms, such as metal oxides, metal nitrides, and zero-valent metals.

These inorganic-organic hybrid materials suffer from a number of drawbacks which limit their utility. For example, the size of the domain that the inorganic materials assume within the hybrid depends on the particle size of the inorganic material particulate or fiber used in making the hybrid. In addition, the homogeneity of the inorganic-organic hybrid material largely depends on either the solubility of the inorganic material in the polymeric melt or on the solubility of the inorganic material in the solvent used to solubilize the polymeric material. Furthermore, the properties and molecular structures of these hybrids depend greatly on the methods used to extrude, cast, or dry the solid hybrid material from the melt or solubilized mixtures, which gives rise to significant, undesirable, and frequently uncontrollable batch-to-batch and regional variations.

Inorganic-organic hybrid materials have also been prepared by dispersing powdered or particulate forms of inorganic materials within various polymeric matrices.

For example, U.S. Pat. No. 5,500,759 to Coleman ("Coleman") discloses electrochromic materials made by dispersing electrically conductive metal particles into polymeric matrices; U.S. Pat. No. 5,468,498 to Morrison et al. ("Morrison") describes aqueous-based mixtures of colloidal vanadium oxide and dispersed sulfonated polymer which are useful for producing antistatic polymeric coatings; U.S. Pat. No. 5,334,292 to Rajeshwar et al. ("Rajeshwar") discloses conducting polymer films containing nanodispersed inorganic catalyst particles; and U.S. Pat. No. 5,548,125 to Sandbank ("Sandbank") discloses methods for melt- or thermo-forming flexible polymeric gloves containing particulate tungsten which makes the gloves useful for shielding x-radiation.

Although the inorganic-organic hybrid materials are homogeneously mixed, they contain separate inorganic and organic phases on a macromolecular scale. These separate phases frequently give rise to the inorganic material's migration within and/or leaching out of the polymeric matrix. Furthermore, the inorganic phases of these inorganic-organic hybrid materials can be separated from the polymer matrix by simple mechanical processes or by solvent extraction of the polymer. Consequently, upon exposure to certain temperatures or solvents, the inorganic phases of these hybrids can migrate and dissipate out of or accumulate in various regions within the polymeric matrix, reducing its useful life.

Because of the problems associated with migration and leaching of the inorganic phase in inorganic-organic hybrids, hybrid materials containing inorganic phases having greater stability have been developed. These materials rely on physically entrapping large interpenetrating macromolecular networks of inorganic materials in the polymeric chains of the organic material.

For example, U.S. Pat. No. 5,412,016 to Sharp ("Sharp") describes polymeric inorganic-organic interpenetrating network compositions made by mixing a hydrolyzable precursor of an inorganic gel of Si, Ti, or Zr with an organic polymer and an organic carboxylic acid to form a homogeneous solution. The solution is then hydrolyzed, and the resulting hybrid materials are used to impart added toughness to conventional organic polymers as well as to increase their thermal stabilities and abrasion resistances. U.S. Pat. No. 5,380,584 to Anderson et al. ("Anderson I") describes an electrostatography imaging element which contains an electrically-conductive layer made of a colloidal gel of vanadium pentoxide dispersed in a polymeric binder. U.S. Pat. No. 5,190,698 to Coltrain et al. ("Coltrain I") describes methods for making polymer/inorganic oxide composites by combining a polymer derived from a vinyl carboxylic acid with a metal oxide in a solvent solution, casting or coating the resulting solution, and curing the resulting sample to form a composite of the polymer and the metal oxide. These composites are said to be useful for forming clear coatings or films having high optical density, abrasion resistance, or antistatic properties. U.S. Pat. No. 5,115,023 to Basil et al. ("Basil") describes siloxane-organic hybrid polymers which are made by hydrolytic condensation polymerization of organoalkyoxysilanes in the presence of organic film-forming polymers. The method is similar to that described in Sharp and, similarly, is used to improve a polymer's mechanical strength and stability while maintaining its flexibility and film forming properties. U.S. Pat. No. 5,010,128 to Coltrain et al. ("Coltrain II") describes methods for blending metal oxides with etheric polyphosphazenes to increase abrasion resistance and antistatic properties of polyphosphazene films. These methods, like those of Coltrain I, employ inorganic metal precursors which contain hydrolyzable leaving groups.

In each of the foregoing, the polymeric inorganic-organic interpenetrating network compositions are obtained by, sequentially, (1) adding hydrolyzable metals (or hydrolyzed metal gels) into either a polymer melt or a solvent containing a dissolved polymer; (2) adding a hydrolyzing agent or adjusting the pH of the solution to effect hydrolysis; (3) mixing; and (4) curing.

The methods described, however, suffer from several limitations. For example, they are limited to incorporating interpenetrating metal oxide networks into polymers which have similar solubilities as the hydrolyzable metal precursors or the hydrolyzed metal. In addition, because the method involves first mixing the inorganic hydrolyzable metal precursors or the hydrolyzed metal with the organic polymer and then curing the mixture, curing of the inorganic phase and organic phase necessarily occurs simultaneously. Since both the inorganic and organic materials are in intimate contact during the curing process, the organic phase of the resulting hybrid has physical characteristics different from that of the same polymer cured in the absence of an inorganic phase. This makes it difficult and, in many cases, impossible to predict the concentration of inorganic material necessary to preserve the desired properties of the starting organic polymer material or to predict the properties of the resulting hybrid. Typically, crystallinity and/or free volume in the hybrid materials are significantly different than the starting organic polymer materials cured in the absence of the inorganic phase. The methods also have limited utility because they provide no control over the spatial distribution of the inorganic and organic phases within the polymeric inorganic-organic interpenetrating network hybrid. For example, it is difficult and, in many cases, impossible to control which phase dominates the surface of the bulk material or the surface of the free volume within the bulk material. This variability can cause quality control problems as well as limit the usefulness of the hybrid materials with respect to bulk versus surface properties.

Alternatively, it has been demonstrated that inorganic and organic molecules can be impregnated into solid matrices using supercritical fluids.

WO 94/18264 to Perman et al. describes the use of supercritical fluids for impregnating a variety of specific additives into polymer substrates by simultaneously contacting the polymer substrate with the impregnation additive and a carrier liquid, such as water, in the presence of a supercritical fluid. The described method requires that a polymeric material be simultaneously exposed to an impregnation additive and a carrier liquid, and, then, all three of these components are exposed to a supercritical fluid in a high pressure vessel for a sufficient time to swell the polymeric material so that the carrier liquid and impregnation additive can penetrate the swollen polymeric material.

In Clarke et al., *J. Am. Chem. Soc.*, 116:8621 (1994), supercritical fluid is used to impregnate polyethylene with $CpMn(CO)_3$ using supercritical $CO_2$ which acts to both solvate the $CpMn(CO)_3$ and to swell the polyethylene, thus permitting the flow of $CpMn(CO)_3$ into the free space created in the swollen polymer and into the free volume of the polymeric material.

Watkins et al., *Macromolecules*, 28:4067 (1995) discloses methods for polymerizing styrene in supercritical $CO_2$-swollen poly(chlorotrifluoroethylene) ("PCTFE").

Methods for impregnating polymeric materials with additives using supercritical fluids suffer from a number of important drawbacks. First, the method requires the use of a high pressure apparatus. Second, the method requires that the supercritical fluid or another suitable carrier solvent be available to solvate the additive to be impregnated in the polymer matrix. Third, the method requires that the polymeric material be grossly swollen to permit the additive to penetrate and, thus, to impregnate the polymeric material. This swelling results in large changes in the host polymer's surface and bulk morphology and also results in a lack of control of the final hybrid material's composition. Finally, this method allows no control over the resulting surface properties of the hybrid materials. Together, these changes and lack of control lead to a variety of physical and chemical changes in the host polymer, including changes in properties such as flexibility, crystallinity, and thermal characteristics. Finally, in most cases where supercritical methods are used to impregnate additives into polymeric materials, the impregnated additive can be readily diffused out of the polymeric material by exposure of the polymeric material to supercritical fluid conditions or, in some cases, to various solvents.

For these and other reasons, there remains a need for inorganic-organic polymer composites and for methods of preparing these inorganic-organic polymer composites which do not suffer from the above-described limitations as well as for methods of preparing these composites which permits control over the surface properties (e.g., wetability, reactivity, adhesiveness, and physical and chemical toughness). The present invention is directed to meeting this need.

SUMMARY OF THE INVENTION

The present invention relates to a method for making an oxyhalopolymer composite. The method includes providing an oxyhalopolymer which has free volume therein. The oxyhalopolymer's free volume is evacuated, and inorganic or organic molecules are infused into the evacuated free volume of the oxyhalopolymer.

The present invention also relates to another method for making an oxyhalopolymer composite. In this method, a halopolymer composite is provided. The halopolymer composite's surface halogen atoms are then modified under conditions effective to substitute at least a portion of the halopolymer composite's surface halogen atoms with hydrogen atoms and oxygen atoms or oxygen-containing radicals.

The present invention also relates to a method for making a surface-oxyhalogenated non-halopolymer composite. The method includes providing a surface-oxyhalogenated non-halopolymer having free volume therein. The method further includes evacuating the free volume of the surface-oxyhalogenated non-halopolymer, and infusing inorganic or organic molecules into the evacuated free volume of the surface-oxyhalogenated non-halopolymer.

The present invention also relates to another method for making a surface-oxyhalogenated non-halopolymer composite. In this method, a surface-halogenated non-halopolymer composite is provided. The method further includes modifying the surface-halogenated non-halopolymer composite's surface halogen atoms under conditions effective to substitute at least a portion of the surface-halogenated non-halopolymer composite's surface halogen atoms with hydrogen atoms and oxygen atoms or oxygen-containing radicals.

The present invention, in another aspect thereof, is related to an oxyhalopolymer composite. The oxyhalopolymer composite includes an oxyhalopolymer having free volume therein and an inorganic or organic material disposed in the free volume of the oxyhalopolymer.

The present invention also relates to a surface-oxyhalogenated non-halopolymer composite. The composite includes a surface-oxyhalogenated non-halopolymer having free volume therein and an inorganic or organic material disposed in the free volume of the surface-oxyhalogenated non-halopolymer.

The composites of the present invention contain polymeric phases which have physical properties substantially similar to the properties of the native polymer (i.e., polymer in the absence of inorganic or organic molecules or macromolecular networks). Consequently, the composites of the present invention, relative to conventional inorganic-organic hybrid materials, have significantly more predictable mechanical properties. The composites of the present invention also have controllable, predictable, and reproducible levels of optical densities and electrical, ionic, and charged species conductivities, which make them useful in various applications including photoradiation shields and filters, electromagnetic radiation shields and filters, heterogeneous catalytic substrates, and conducting electrodes. These characteristics also make these composites useful as components in the construction of electrolytic cells, fuel cells, optoelectronic devices, semiconductors for microelectronic applications, and materials having flame and heat retardant properties. In addition, the composites of the present invention also have a surface containing halogen atoms, a portion of which have been replaced with hydrogen atoms and oxygen atoms or oxygen-containing groups. The oxyhalopolymer surface retains many of the positive attributes characteristic of halopolymer surfaces, such as tendency to repel water and other polar solvents, high thermal stability, and low adhesion and friction coefficients. However, unlike halopolymer surfaces, the surfaces of the oxyhalopolymer composites of the present invention have reactive chemical sites which permit bonding with other chemical functionalities, such as organosilicons, organometallic precursors, transition metal ions and compounds, transition metal films, fluorescent compounds and other dyes, and biological materials, such as proteins, enzymes, and nucleic acids. In addition, by proper choice of the infused inorganic material and chemical functionality at the surface, polymer composites having an inorganic surface which is the same as, silmilar to, or different from the infused inorganic material can be prepared. Such materials are useful, for example, in preparing metal oxide/fluoropolymer composites having a pure metal oxide surface.

DETAILED DESCRIPTION OF THE INVENTION

Figure 1:
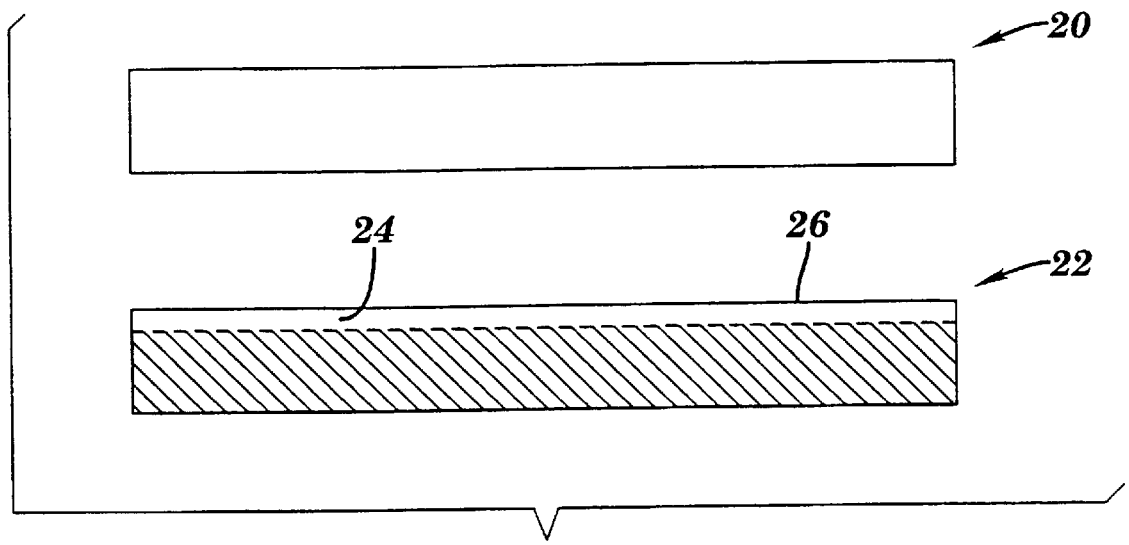
FIG. 1 is a diagram illustrating the results of infusion of halopolymer composites.

As used herein, oxyhalopolymers refer to halopolymer bulk materials whose surface is modified with hydrogen atoms and oxygen atoms or oxygen-containing radicals.

As used herein oxyhalopolymer composites refer to oxyhalopolymers in whose free volume is disposed an inorganic or organic material.

As used herein, halopolymers refer to halopolymer bulk materials, which have surface halogen atoms.

As used herein, halopolymer composites refer to halopolymers in whose free volume is disposed an inorganic or organic material.

As used herein, non-halopolymers refer to polymeric bulk materials other than halopolymers.

As used herein, non-halopolymer composites refer to on-halopolymers in whose free volume is disposed an inorganic or organic material.

As used herein, surface-halogenated non-halopolymers refer to non-halopolymers whose surface is modified with molecularly bonded halogen atoms or a halocarbon or halohydrocarbon film. The outer surface of the surface-halogenated non-halopolymers thus has surface halogen atoms.

As used herein, surface-halogenated non-halopolymer composites refer to surface-halogenated non-halopolymers in whose free volume is disposed an inorganic or organic material.

As used herein, surface-oxyhalogenated non-halopolymers refer to surface-halogenated non-halopolymers whose molecularly bonded surface halogen atoms or halocarbon or halohydrocarbon film's surface halogen atoms are modified with hydrogen atoms and oxygen atoms or oxygen-containing radicals.

As used herein, surface-oxyhalogenated non-halopolymer composites refer to surface-oxyhalogenated non-halopolymers in whose free volume is disposed an inorganic or organic material.

As used herein, polymers refer to one or more of the above halopolymers, non-halopolymers, oxyhalopolymers, surface-halogenated non-halopolymers, surface-oxyhalogenated non-halopolymers.

As used herein, polymer composites refer to one or more of the above halopolymer composites, non-halopolymer composites, oxyhalopolymer composites, surface-halogenated non-halopolymer composites, and surface-oxyhalogenated non-halopolymer composites.

The present invention relates to an -oxyhalopolymer composite. The oxyhalopolymer composite includes an oxyhalopolymer having free volume therein and an inorganic or organic material disposed in the free volume of the oxyhalopolymer.

The present invention also relates to a surface-oxyhalogenated non-halopolymer composite. The composite includes a surface-oxyhalogenated non-halopolymer which has free volume therein. The surface-oxyhalogenated non-halopolymer composite further includes an inorganic or organic material disposed in the-free volume of the surface-oxyhalogenated non-halopolymer.

The oxyhalopolymer can be an organic based halopolymer or an inorganic-organic hybrid halopolymer. Organic based halopolymers suitable for use in the composites of the present invention can be homopolymers, copolymers, multicomponent polymers, or combinations thereof, so long as at least some of the homopolymers, copolymers, multicomponent polymers, or combinations thereof contains halopolymer. Halopolymers are organic polymers which contain halogenated groups, such as fluoroalkyl, difluoroalkyl, trifluoroalkyl, fluoroaryl, difluoroalkyl, trifluoroalkyl, perfluoroalkyl, perfluoroaryl chloroalkyl, dichloroalkyl, trichloroalkyl, chloroaryl, dichloroalkyl, trichloroalkyl, perchloroalkyl, perchloroaryl, chlorofluoroalkyl, chlorofluoroaryl, chlorodifluoroalkyl, and dichlorofluoroalkyl groups. Suitable halopolymers include fluoropolymers and fluorochloropolymers, polyfluoroalkylenes, poly(fluoroalkyl vinyl ethers), halodioxole homopolymers, and copolymers of halodioxoles and substituted dioxoles, polyvinylpyrrolidone, or combinations thereof. Other suitable halopolymers include fluorohydrocarbon polymers, such as polyvinylidine fluoride ("PVDF"), polyvinylflouride ("PVF"), polychlorotetrafluoroethylene ("PCTFE"), polytetrafluoroethylene ("PTFE") (including expanded PTFE ("ePTFE")). Fluoropolymers are preferred for many applications because of their extreme inertness, high thermal stability, hydrophobicity, low coefficients of friction, and low dielectric properties. In addition to retaining these desirable properties, in many applications, particularly catalytic applications, it is advantageous to utilize the highly electronegative characteristics of these fluoropolymers for enhancing the catalytic properties of metals by associating these metals with the fluoropolymers. Suitable fluoropolymers include perfluorinated resins, such as perfluorinated siloxanes, perfluorinated styrenes, perfluorinated urethanes, and copolymers containing tetrafluoroethylene and other perfluorinated oxygen-containing polymers like perfluoro-2,2-dimethyl-1,3-dioxide (which is sold under the trade name TEFLON-AF). Other halopolymers which can be used in the composites of the present invention include perfluoroalkoxy-substituted fluoropolymers, such as MFA (available from Ausimont USA (Thoroughfare, N.J.)), of PFA (available from DuPont (Willmington, Del.)), polytetrafluoroethylene-co-hexafluoropropylene ("FEP"), ethylenechlorotrifluoroethylene copolymer ("ECTFE"), and tetrafluoroethylene/vinyl alcohol copolymers.

Non-halopolymers suitable for use in the practice of the present invention include organic based non-halopolymers or inorganic-organic hybrid non-halopolymers. Organic based non-halopolymers can be homopolymers, copolymers, multicomponent polymers, or combinations thereof, so long as they contain no significant amounts of halopolymer. That is, the non-halopolymer can include halopolymers, but only in amounts insufficient to render the non-halopolymer's chemical and physical properties closer to those of a pure halopolymer than to those of a pure non-halopolymer. Suitable organic non-halopolymers include polyimides, polyamides, polyalkylenes, such as polyethylene, polypropylene, and polybutylene, poly (phenylenediamine terephthalamide) filaments, modified cellulose derivatives, starch, polyesters, polymethacrylates, polyacrylates, polyvinyl alcohol, copolymers of vinyl alcohol with ethylenically unsaturated monomers, polyvinyl acetate, poly(alkylene oxides), vinyl chloride homopolymers and copolymers, terpolymers of ethylene with carbon monoxide and with an acrylic acid ester or vinyl monomer, polysiloxanes, polyester based polymers, examples of which include polyethyleneterephthalates, polycarbonates, and analogs and copolymers thereof.

Polyphenylene ethers can also be employed as non-halopolymers in the composites of the present invention. These include poly(2,6-dimethyl-1,4-phenylene ether), poly (2,6-diethyl-1,4-phenylene ether), poly(2-methyl-6-ethyl-1, 4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-pheneylene ether), and the like.

Examples of suitable polyamides include polyhexamethylene adipamide (nylon 66), polyhexamethylene azelamide (nylon 69), polyhexamethylene sebacamide (nylon 610), polyhexamethylene dodecanoamide (nylon 612), poly-bis-(p-aminocyclohexyl) methane dodecanoamide, polytetramethylene adipamide (nylon 46) and polyamides produced by ring cleavage of a lactam such as polycaprolactam (nylon 6) and polylauryl lactam. Furthermore, there may be used polyamides produced by polymerization of at least two amines or acids used for the production of the above-mentioned polymers, for example, polymers produced from adipic acid, sebacic acid and hexamethylenediamine. The polyamides further include blends of polyamides, such as a blend of nylon 66 and nylon 6,including copolymers such as nylon 66/6.

Aromatic polyamides may also be used as non-halopolymers in the present invention. Preferably they are incorporated in copolyamides which contain an aromatic component, such as melt-polymerizable polyamides containing, as a main component, an aromatic amino acid and/or an aromatic dicarboxylic acid, such as para-aminoethylbenzoic acid, terephthalic acid, and isophthalic acid.

Typical examples of the thermoplastic aromatic copolyamides include copolymer polyamide of p-aminomethylbenzoic acid and ε-caprolactam (nylon AMBA/6), polyamides mainly composed of 2,2,4-/2,4,4-trimethylhexamethylene-diamineterephthalamide (nylon TMDT and Nylon TMDT/6I), polyamide mainly composed of hexamethylene diamineisophthalamide, and/or hexamethylenediamineterephthalamide and containing, as another component, bis(p-aminocyclohexyl)methaneisophthalamide and/or bis(p-aminocyclohexyl) methaneterephthalamide, bis (p-aminocyclohexyl)propaneisophthalamide and/or bis(p-aminocyclohexyl)propaneterephthalamide, (nylon 6I/PACM I, nylon 6I/DMPACM I, nylon 6I/PACP I, nylon 6I/6T/ PACM I/PACM T, nylon 6I/6T/DMPACM I/DMPACM T, and/or nylon 6I/6T/PACP I/PACP T).

Styrene polymers can also be used. These include polystyrene, rubber modified polystyrene, styrene/ acrylonitrile copolymer, styrene/methylmethacrylate copolymer, ABS resin, styrene/alphamethyl styrene copolymer, and the like.

Other suitable representative non-halopolymers include, for example, poly(hexamethylene adipamide), poly(ε-caprolactam), poly(hexamethylene phthalamide or isophthalamide), poly(ethylene terephthalate), poly (butylene terephthalate), ethylcellulose and methylcellulose, poly(vinyl alcohol), ethylene/vinyl alcohol copolymers, poly(vinyl acetate), partially hydrolyzed poly(vinyl acetate), poly(methyl methacrylate), poly(ethyl methacrylate), poly (ethyl acrylate), poly(methyl acrylate), ethylene/carbon monoxide/vinyl acetate terpolymers, ethylene/carbon monoxide/methyl methacrylate terpolymers, ethylene/ carbon monoxide/n-butyl acrylate terpolymers, poly (dimethylsiloxane), poly(phenylmethylsiloxane), polyphosphazenes and their analogs, poly(heptafluoropropyl vinyl ether), homopolymers and copolymers of perfluoro(1,3-dioxole) and of perfluoro(2,2-dimethyl-1,3-dioxole), optionally with another ethylenically unsaturated comonomer, poly(ethylene oxide), poly(propylene oxide), and poly (tetramethylene oxide).

These and other suitable halopolymers and non-halopolymers can be purchased commercially. For example, poly(phenylenediamine terephthalamide) filaments can be purchased from Dupont under the tradename KEVLAR™. Alternatively, polymers suitable for the practice of the present invention can be prepared by well known methods, such as those described in Elias, *Macromolecules—Structure and Properties I and II*, New York:Plenum Press (1977) ("Elias"), which is hereby incorporated by reference.

The halopolymer and non-halopolymer can, alternatively, be an inorganic-organic hybrid polymer or blend of organic polymer and inorganic-organic hybrid polymer. Inorganic-organic hybrid polymers suitable for the practice of the present invention include those prepared by conventional methods for making organic-inorganic hybrid materials, such as those described in Roberts, Pryor, Nagaoka, Coleman, Morrison, Rajeshwar, Sandbank, Sharp, Anderson I, Basil, and Coltrain I and II, which are hereby incorporated by reference.

The halopolymer and non-halopolymer, in addition to an organic based polymer or an inorganic-organic hybrid polymer, can contain a variety of materials which are known in the art to modify the properties of the polymer. These include, fillers, cross-linking agents, stabilizers, radical scavengers, compatabilizers, antistatic agents, dyes, and pigments. Their inclusion or exclusion will depend, of course, on the use to which the composite will be put, as will be apparent to one skilled in the art.

The materials which make up the polymer (i.e., the halopolymer, the oxyhalopolymer, the non-halopolymer, the surface-halogenated non-halopolymer, or the surface-oxyhalogenated non-halopolymer), be they an organic polymer or an inorganic-organic hybrid material, contain free volume.

The polymer can be of any form suitable for the use to which the composite is to be put. For example, the polymer can be an organic based polymer resin, powder, or particulate or, alternatively, an inorganic-organic hybrid polymer resin, powder, or particulate. Suitable particulate forms include sheets, fibers, or beads. As used herein, sheets are meant to include films, fibers are meant to include filaments, and beads are meant to include pellets. Beads having diameters of from about 0.1 mm to about several mm and powders having diameters of from about 10 nm to about 0.1 mm and made from PVDF, PTFE, FEP, ECTFE, PFA, or MFA are particularly useful in many applications.

Alternatively, the polymer can be of a form that is different from the one desired for the composite. The inorganic or organic materials are infused into resins in the form of polymer powders, beads, or the like. The infused polymer powders, beads, etc. can then be processed by conventional polymer processing methods into the desired shape. For example, the infused polymer powders, beads, etc. can be extruded into finished sheets or fibers. Alternatively, the infused polymer powders, beads, etc. can be applied to solid objects, such as walls and boat hulls by, for example, spraying, sputtering, or painting (e.g., brushing or rolling) the infused polymer powders, beads, or pellets onto the object under conditions effective to produce a thin film or coating of the infused polymer on the object.

The composites of the present invention, particularly those in the form of beads, sheets, or fibers, can be infused uniformly or non-uniformly. For example, the present invention includes a sheet having two opposing surfaces where the portion of the sheet in proximity to one surface is infused while another portion of the sheet in proximity to the opposite surface is not. This non-uniform infusing can be carried out, for example, by covering one of the sheet's surfaces with a material that prevents evacuation of the free volume in proximity to the covered surface or, alternatively or additionally, that prevents the infusing material from contacting the covered surface.

For purposes of this invention, free volume is used in a manner consistent with the description of free volume in Elias at pp. 186–188,which is hereby incorporated by reference. Briefly, Elias points out that, by definition, no extensive long-range order can exist in amorphous regions. Elias further notes that these amorphous regions are not x-ray crystalline, and, although studies suggest that x-ray amorphous polymers may have certain order, a definite number of vacant sites must be present. Thus, free volume, as used herein, relates to the vacant sites which are present in amorphous regions of a polymer and into which organic or inorganic molecules can diffuse. The free volume is exploited in accordance with the present invention as regions into which inorganic or organic materials can be introduced, such as by diffusion, and subsequently assembled into macromolecular networks or stabilized through interaction with the polymer's functionality. These free volumes generally form during the curing process, such as upon evaporation of the solvent in which the polymer was formed, but the present invention is not intended to be limited by the mechanism by which the free volume comes to exist in the polymer.

For purposes of this invention, free volumes can be natural free volumes or created free volumes. Natural free volume, as used herein, relates to the vacant sites which are characteristically present in amorphous regions of a polymer and into which organic or inorganic molecules can diffuse. These natural free volumes include those which are formed during the curing process, such as upon evaporation of the solvent in which the polymer was formed. In contrast, created free volumes are those free volumes which are produced or modified subsequent to the formation of the polymer by exposing the polymer to supercritical fluids under supercritical conditions. Preferably, the free volumes of the composites of the present invention are natural free volumes and do not contain created free volumes. In this preferred ambodiment, these natural free volumes contain substantially no carrier liquid or other solvent used in supercritical infusion processes.

The total natural free volume available for diffusing inorganic or organic molecules in a particular polymer is dependent on a variety of characteristics of the natural free volume. These include the size, size distribution, concentration, and spatial distribution of the natural free volume, all of which are effected by the conditions under which the polymer was formed, including, for example: how the solvent was removed; the pressure and temperature (and variations therein) during the solvent removal process; the degree to which the polymer was cured prior to onset of the solvent removal process; the nature of the solvent; the nature of the organic or inorganic-organic hybrid polymer; the size of the polymer matrix; and the like. Another factor affecting the natural free volume of the polymer is the degree of crystallinity. Polycrystalline regions contained within halopolymer and non-halopolymer have less natural free volume than amorphous regions, are tightly packed, and inhibit movement of inorganic molecules into the polymer. Thus, it is preferred that the polymer have at least some degree of non-crystallinity (i.e., that it have a crystallinity of less than 100%). Suitable polymers (e.g., halopolymers and non-halopolymers) are those which have crystallinities of less than 99%, preferably less than 95%. The total natural free volume of the polymer (i.e., the collective volume of the natural free volumes) ("$V_s$") is preferably greater that about $1\times10^{-6}$ of the total volume of the polymer. Expressed differently, if the total volume of the polymer is designated $V_c$, then the collective volume of the natural free volume is preferably greater than about $1\times10^{-6}$ $V_c$, more preferably from about $1\times10^{-6}$ $V_c$ to about 0.1 VC, and still more preferably from about $1\times10^{-3}$ $V_c$ to about 0.1 $V_c$.

The natural free volume can be an inherent property of the polymer (i.e., a property which is established by the method used to initially form the polymer) or, alternatively, it can be controlled after formation of the polymer matrix by any suitable means (other than by exposure to supercritical fluids under supercritical conditions), such as by increasing or decreasing the temperature of the polymer when the inorganic or organic materials are diffused thereinto. For example, increasing the temperature at which the inorganic or organic molecules are diffused into the polymer increases the natural free volume of the polymer without substantially altering its physical and mechanical properties. Thus, a greater concentration of the inorganic or organic molecules can be diffused into the halopolymer and non-halopolymer, which results in, for example, a greater concentration of the macromolecular network in the polymer.

Methods for determining the natural free volume as a fraction of the total polymer volume (i.e., $V_s/V_c$) are well known to those skilled in the art. Illustrative methods can be found in Elias at pp. 256–259, which is hereby incorporated by reference. The polymer's natural free volume can also be determined by the flow rate of gases through the polymer. Natural free volume and its distribution in the polymer can also be determined by using a photoreactive probe, such as the one described in Horie, "Dynamics of Electron-Lattice Interactions," in Tsuchida, ed., *Macromolecular Complexes: Dynamic Interactions and Electronic Processes*, New York:VCH Publishers, pp. 39–59 (1991), which is hereby incorporated by reference.

In addition to having free volume therein, the polymer used in the method of the present invention also has a halogenated surface. In the case where the polymer is a halopolymer, the halopolymer will naturally have a halogenated surface (i.e., a surface with exposed surface halogen atoms). In the case where the polymer is a non-halopolymer, the surface can contain molecularly bonded halogen atoms (i.e., halogen atoms bonded directly to the carbon backbone of the non-halopolymer at the non-halopolymer's surface), or, alternatively, the surface can be modified with a halocarbon or halohydrocarbon film. The thickness of the film is not critical to the practice of the present invention and can range from several microns to several inches, depending on the size of the non-halopolynmer on which it is coated and the application to which it is to be put. Preferred halocarbon and halohydrocarbon films are those which are polymeric in nature, for example, which are made of the halopolymers set forth above.

As indicated above, a portion of the surface halogen atoms of the oxyhalopolymer composites and surface-oxyhalogenated non-halopolymer composites of the present invention are substituted with hydrogen atoms and oxygen atoms or oxygen-containing radicals. In this regard, the objective is to have either oxygen or oxygen-containing groups disposed on the halopolymer or on the non-halopolymer's halogenated or halocarbon or halohydrocarbon surface in place of some of the halogen atoms to form a stable intermediate material. Generally, the oxygen atoms are not directly bonded into the polymer backbone per se (e.g., to form a C—O—C backbone), but only substitute for existing halogen atoms which are pendent on the carbon backbone. Representative oxygen-containing radicals suitable for use in the composites of the present invention include hydroxyl (—OH), ether (C—O—C), epoxide (—O—), aldehyde (—CHO), ester (—C(O)O—), and carboxylic acid (—COOH). Other suitable oxygen-containing radicals include oxo, alkoxy (e.g., methoxy, ethoxy and propoxy), radicals having the formula R'—CO— where R' is hydrogen or alkyl (particularly C1 to C5 lower alkyl, e.g., methyl, ethyl, n-propyl, isopropyl, n-butyl, isobutyl, tert-butyl, n-pentyl, isopentyl, neopemtyl, and the like), and combinations thereof. In addition, the oxygen-containing radicals can also take the form of $PO_y$ or $SiO_y$, where y and y' are 2–3. Mixtures of oxygen and one or more oxygen-containing radicals and mixtures of two or more oxygen-containing radicals can also be present on the surface. In general, the oxygen sites on the surface of a halopolymer or a surface halogenated non-halopolymer need only be of such concentration that the oxygen functionality and resulting backbone of the polymer be stable. Typically, from about 1 to about 98%, preferably from about 3 to about 70% of the original surface halogen atoms on the halopolymer or surface halogenated non-halopolymer are substituted with oxygen or oxygen-containing groups.

Oxyfluoropolymers, when produced by radio frequency glow discharge ("RFGD"), exhibit a wide variety of surface free energy increases where, for example, a fluoropolymer like PTFE with a $\gamma_c$ of about 18 dynes/cm at 20° C. can be increased to about 40 dynes/cm to a depth of between about 10 to about 100 Å for increased wettability and other surface properties relating to the surface free energy of a material. Even with such increases in surface free energy the hydrophobic properties of the original material are not destroyed. That is, the composites of the present invention, having hydrogen, oxygen, and fluoride functionalities that are covalently bonded to the carbon polymer backbone, still may inhibit surface fouling, permeation, and wetting by liquids with high surface tensions (e.g., having surface tensions greater than about 50 dynes/cm), such as water and other similar polar solvents, while being wettable by liquids having low surface tensions (e.g., surface tensions less than 50 dynes/cm), such as blood plasma and other nonpolar organic solvents.

As indicated above, the composite of the present invention further includes an inorganic or organic material which is disposed in the polymer's free volume, preferably in the polymer's natural free volume. The amount of the inorganic or organic material within the natural free volume is typically proportionate to the internal surface area of the starting polymer's natural free volume, which, as described above, can be an inherent characteristic of the polymer or can be controlled by any suitable means (other than by exposure to supercritical conditions), for example, by increasing or decreasing the temperature at which the inorganic or organic material is diffused thereinto. The inorganic material can fill the polymer's free volume (or just the natural free volume) or occupy a significant portion thereof in two or three dimensions. The inorganic material can itself form three dimensional networks within the polymer's free volume. These three dimensional networks can be dense, substantially filling all the free volume, or they can be porous, thus permitting the flow of gas molecules into and out of the free volume and through the three dimensional inorganic or organic macromolecular network. Alternatively, the inorganic material can be a two-dimensional layer (such as a coating or film) on or along the surface or a portion of the surface of the free volume. In the case where the free volume is small, the inorganic or organic material may follow the one-dimensional template of the starting material. This results in a two-dimensional morphology depending on the inherent chemistry and/or the physical morphology at the free-volume/polymer interfaces. Preferably, the inorganic or organic material is homogeneously or substantially homogeneously spread throughout the entire natural free volume of the polymer.

Any suitable inorganic material can be employed. Preferred inorganic materials suitable for use in the practice of the present invention are those capable of having a vapor pressure greater than zero at a temperature between room temperature and the thermal decomposition temperature of the polymeric material and/or at pressures of from about 0.1 mTorr to about 10 Torr. By inorganic material, it is meant that the material contains at least one metal ion or atom. As used herein, all atoms, other than hydrogen, oxygen, fluorine, chlorine. bromine, helium, neon, argon, krypton, xenon, and radon are considered to be metal atoms. Preferred metal atoms are the alkali metals, the alkaline earth metals, the transition elements, the lanthanides, the actinides, boron, aluminum, gallium, indium, thallium, silicon, germanium, tin, lead, phosphorous, arsenic, antimony, bismuth, selenium, tellurium, polonium, and astatine. In addition, carbon, nitrogen, sulfur, and iodine are considered metals, particularly in cases where they are bonded to other atoms via non-covalent bonds (e.g., ionic bonds and pi-pi bonds). Particularly useful inorganic Materials are those which contain a metal selected from the group consisting of V, W, Fe, Ti, Si, Al, P, Sb, As, Ba, B, Cd, Ca, Ce, Cs, Cr, Co, Cu, Ga, Ge, In, Pb, Mg, Hg, Mo, Ni, Nb, Re, Ta, Tl, Sn, Ir, Rh, Th, Ru, Os, Pd, Pt, Zn, Au, Ag, and combinations thereof. Illustrative inorganic materials contemplated for use in the present invention also include metal ions or metal atoms which contain at least one active ligand. These metal ions or metal atoms which contain at least one active ligand can be polymerized to form a bond to a neighboring metal atom or ion, thereby forming a macromolecular complex, or they can be treated so that they interact with a functionality contained in the polymer to form, for example, a metal species stabilized via complexation by the polymer's functionality. Such metal ions or metal atoms include metallo-oxo species, metallo-nitro species, pi-allyl and arene complexes of Group IIIa, IVa, Va, VIa, VIIa, and VIIIa metals, and organo-metallo complexes ligated to organic functionalities like chlorides, bromides, alkyls, aryls, carboxylic acids, carbonyls, alkoxides, pyridines, tetrahydrofurans, and the like.

Preferably, the inorganic material is in the form of a macromolecular network or interacted with a functionality contained within the polymer. The macromolecular networks and interacted inorganic materials are preferably stable to diffusion out of the polymer at temperatures at which the composite is to be employed. For example, where the composite of the present invention is to be used as a catalyst, it is advantageous that the inorganic macromolecular network or inorganic material interacted with a functionality contained within the polymer be stable to diffusion at temperatures employed in carrying out the particular catalytic reaction.

Suitable functionalities with which the inorganic material can interact include halogens (such as fluorines or chlorines), amines, alkenes, alkynes, carbonyls (such as keto groups, aldehyde groups, carboxylic acid groups, ester groups, amide groups, and the like), alcohols, and thiols. Inorganic molecules which are interacted with functionalities on the polymer can have the formula $M^y\text{-}X_j$, where X is a functionality contained within the polymer (e.g., halogen, such as F or Cl, $NH_2$, NH, O—C=O, C—O H, C=C, C≡C, or C=O), y is the oxidation state of the metal, which can range from zero to the highest oxidation state of the particular metal, and j is the number of ligands to which the particular metal can ligate within a given polymer. For example, where M is Pd, and X is Cl, j can be 2.

Illustrative inorganic macromolecular networks which are stable to diffusion include metal atoms and macromolecular networks. Macromolecular networks, as used herein, are molecules containing three or more, preferably more than about 20, more preferably more than about 100, metal atoms that are directly or indirectly bonded together. Suitable macromolecular networks include polycondensates, such as those having the formula $[X(O)_n\text{—}O_y\text{—}X(O)_n]_m$, wherein m is an integer from about 1 to about 10,000 or more; X represents a metal ion having a charge of +s; s is an integer from 1 to the metal's highest attainable oxidation state; y is an integer from 0 to s; and n is between zero and s/2. The well-known silica, titania, and zirconia structures, in which each metal atom is bonded to four oxygen atoms and each oxygen atom is bonded to two metal atoms, are examples of such macromolecular networks. Other macromolecular networks, such as those in which one or two of the bonds to some of the metal atoms in a silica, titania, or zirconia network are occupied by other moieties, such as alkyl groups, are also contemplated. Other macromolecular networks include those formed from pi-allyl compounds, such as pi-allyl compounds of Group IIIa, IVa, Va, VIa, VIIa, and VIIIa metals. Illustrative pi-allyl compounds suitable for use in the practice of the present invention are described, for example, in Wilke et al., *Angewandte Chemie, International Edition*, 5(2):151–266 (1996), which is hereby incorporated by reference. In particular, these compounds are contemplated as being useful for forming conductive zero-valent macromolecular metal networks (e.g. macro molecular networks of conducting metals in the zero oxidation states), such as those having the formula $M^\circ\text{–}M^\circ_n$, wherein n is from about ½ to about 10,000 and $M^\circ$ is a Group IIIa, IVa, Va, VIa, VIIa, or VIIIa metal.

Any suitable organic material can also be employed. Preferred organic materials suitable for use in the practice of the present invention are those capable of having a vapor pressure greater than zero at a temperature between room temperature and the thermal decomposition temperature of the polymeric material. It is preferred that they also be capable of polymerizing into a macromolecular network (e.g., macromolecular networks having the formula $R\text{–}R_n$, wherein n is an integer from about 1 to about 10,000 and R is a monomer radical), such as through an oxidation, hydrolysis, chemical, electrochemical, or photochemical process. Organic molecules, such as pyrrole, aniline, and thiophene, that can be oxidatively polymerized, such as to form polypyrrole, polyaniline, and polythiophene, are suitable. Other suitable organic molecules are those which can be polymerized by exposure to actinic radiation (e.g., ultraviolet radiation), such as acetylene, which when polymerized forms polyacetylene. Still other illustrative organic molecules include organic monomers which can be converted to organic macromolecules, (i.e., polymers). These include the entire class of organic monomers which can be polymerized to form polymers, such as conducting polymers. A list of these materials, their properties, and their application to the construction of polymeric batteries, electric capacitors, electrochromic devices, transistors, solar cells, and non-linear optical devices and sensors can be found in: Yamamoto, "Macromolecular Complexes: Dynamic Interactions and Electronic Processes", in E. Tsuchida, ed., *Sequential Potential Fields in Electrically Conducting Polymers*, New York:VCH Publishers, pp. 379–396 (1991) ("Yamamoto"), which is hereby incorporated by reference.

Because of the close proximity of the polymer and the inorganic or organic macromolecular network which exists within the natural free volume therein, the chemical functionality contained at the surface of the free volume within the polymer can, in some instances, influence the chemical and electronic characteristics of the inorganic or organic macromolecular network and vice versa. Thus, by altering the polymer, the properties of the inorganic or organic macromolecular network can be influenced. The degree of this influence depends on the nature of the chemistry and electronic properties of the starting polymer. For example, strongly electron-withdrawing atoms, such as fluorine atoms, influence the catalytic properties of many metals. More particularly, Kowalak et al., *Collect. Czech. Chem. Commun*, 57:781–787 (1992), which is hereby incorporated by reference, reports that fluorinating zeolites containing polyvalent metal cations increases these zeolites' activity for inducing acid catalyzed reactions. Therefore, where the composites of the present invention are to be used for their catalytic properties, it can be advantageous to employ polymeric materials bearing strongly electron-withdrawing groups. In some cases, the polymer can contain pendant groups or chemical functionalities located at the free volume interface which can influence the chemical or electronic properties of the inorganic or organic macromolecular network formed in the free volume. The interactions of the pendant groups or chemical functionalities with the macromolecular network contained in the natural free volume can be via through-space interactions (i.e., no actual bond or complex formation between the interacting species), via direct ionic, hydrogen, or covalent bonding, or, in some cases, via the formation of a bond which is commonly found when metal atoms coordinate with non-metals or other metallic atoms or groups. The formation of such bonds between the polymer material and the macromolecular network contained within the polymer material's natural free volume can be detected using methods well known to those skilled in the art, such as ultraviolet-visible spectroscopy, infrared spectroscopy, X-ray photoelectron spectroscopy, nuclear magnetic resonance spectroscopy, and other techniques, including those described in Drago, *Physical Methods in Chemistry*, Philadelphia:W. B. Saunders (1977), which is hereby incorporated as reference.

One of the advantages of the oxyhalopolymer and surface-oxyhalogenated non-halopolymer composites of the present invention is that many of the properties of the starting polymer are substantially preserved. In contrast to the results obtained by supercritical impregnation methods (which have the effect of swelling the polymer material), preferred composites of the present invention (e.g., composites which contain inorganic or organic macromolecular networks disposed in the natural free volume of a polymer) have dimensions which are substantially equal to the dimensions of the starting polymer (i.e., the polymer whose natural free volume contains no inorganic or organic macromolecular networks disposed therein). Preferred composites of the present invention also have flexibility, crystallinity, or thermal decomposition temperatures ("Td") which are substantially the same as the flexibility, crystallinity, or Td of the starting polymer. As used in this context, properties which differ by less than 10% are contemplated as being substantially the same. Td is described in Elias, *Macromolecules—Structure and Properties, I and II*, New York:Plenum Press (1977), which is hereby incorporated by reference. In other situations, it may be desirable to modify these properties so that they are different than those of the starting polymer material. This can be done by choosing an appropriate inorganic or organic molecule. Alternatively or additionally, this can be achieved by subsequent chemical, photochemical, electrochemical, or thermal treatments which can act to initiate interactions between the chemical functionalities of the infused organic or inorganic macromolecular network and the chemical functionalities found at the free volume surface of the polymer. These interactions can lead to, for example, enhanced catalytic activity of metal species in the macromolecular network, enhanced thermal properties of the composite compared with the initial thermal properties of the starting polymer, or enhanced conductivity of an organic conducting macromolecular network. To enhance the conductivity of organic conducting macromolecular networks, the macromolecular network can be doped, for instance, by the chemistry contained in the polymeric material (especially the chemical functionalities of the polymer at the free volume interface) or, alternatively, by a subsequent diffusion of dopant, whereby a dopant molecule is incorporated into the composite. Suitable dopants that can be used to enhance the conductivity of conducting macromolecular networks disposed in the composites of the present invention can be found, for example, in Yamamoto, which is hereby incorporated by reference.

Although, as indicated above, preferred inorganic materials are those which are resistant to diffusion, the present invention is not intended to be limited thereto. For example, the inorganic material can be a compound which can be converted, such as by chemical (e.g. oxidation, hydrolysis or hydrogenation), or electrochemical, photochemical, or thermal methods, to an inorganic macromolecular network or to a metal species interacted with the polymer's functionality which resists diffusion. For example, the inorganic material can be a compound selected from the groups consisting of $VOCl_3$, $W(CO)_6$, $Fe(CO)_5$, $TiCl_4$, $SiCl_4$, $AlCl_3$, $PCl_3$, $SbCl_5$, $As(C_2H_5)_3$, $Ba(C_3H_7)_2$, borane pyridine and tetrahydrofuran complexes, $Cd(BF_4)_2$ $Ca(OOCCH(C_2H_5)C_4H_9)_2$, cerium (III), 2-ethylhexanoate, cesium 2-ethylhexoxide, chromium (III) naphthenate, $CrO_2C_{21}$ $Co(CO)_3NO$, copper (II) dimethylaminoethoxide, triethylgallium, $GeCl_4$, triethylindium, lead napthenate, $C_2H_5MgCl$, $(CH_3)_2Hg$, $MoF_6$, $Ni(CO)_4$, $Nb(OC_2H_5)_6$, $HReO_4$, $Ta(OC_2H_5)_5$, $C_5H_5Tl$, $SnCl_4$, pi-allyl compounds of Group IIIa, IVa, Va, VIa, VIIa, or VIIIa metals, and combinations thereof, all of which can be converted into inorganic materials which resist diffusion.

The oxyhalopolymer composites of the present invention can be prepared, for example, by the methods which follow, to which the present invention also relates.

One method for making an oxyhalopolymer composite according to the present invention includes providing an oxyhalopolymer which has free volume therein and in which at least a portion of the oxyhalopolymer's surface halogen atoms are substituted with hydrogen atoms and oxygen atoms or oxygen-containing radicals. The oxyhalopolymer's free volume is evacuated, and inorganic or organic molecules are infused into the evacuated free volume of the oxyhalopolymer.

The oxyhalopolymer can be prepare by providing a halopolymer and modifying the halopolymer's surface halogen atoms under conditions effective to substitute at least a portion, typically from about 1 to about 98%, preferably from about 3 to about 70% of the halopolymer's surface halogen atoms with hydrogen atoms and oxygen atoms or oxygen-containing radicals. In a preferred embodiment, the halopolymer's surface halogen atoms are modified by radio frequency glow discharge of a gas-vapor under vacuum by contacting the halopolymer with a gas/vapor plasma mixture while exposing the halopolymer to at least one radio frequency glow discharge under vacuum and under conditions effective to substitute at least a portion of the halopolymer's halogen atoms with covalently bonded hydrogen atoms and oxygen atoms or oxygen-containing radicals.

In another method for making an oxyhalopolymer composite according to the present invention, a halopolymer composite is provided. The halopolymer composite includes a halopolymer having free volume therein and an inorganic or organic material disposed in the free volume of the halopolymer. The halopolymer composite's surface halogen atoms are then modified under conditions effective to substitute at least a portion of the halopolymer composite's surface halogen atoms with hydrogen atoms and oxygen atoms or oxygen-containing radicals. In a preferred embodiment, the halopolymer composite's surface halogen atoms are modified by a radio frequency glow discharge of a gas-vapor under vacuum by contacting the halopolymer composite with a gas/vapor plasma mixture while exposing the halopolymer composite to at least one radio frequency glow discharge under vacuum and under conditions effective to substitute at least a portion of the halopolymer composite's halogen atoms with covalently bonded hydrogen atoms and oxygen atoms or oxygen-containing radicals.

The halopolymer composite used in this method can be prepared by providing a halopolymer having free volume therein, evacuating the free volume of the halopolymer, and infusing inorganic or organic molecules into the evacuated free volume of the halopolymer.

The present invention also relates to methods for making a surface-oxyhalogenated non-halopolymer composites.

One such method includes providing a surface-oxyhalogenated non-halopolymer having natural free volume therein. The surface of the surface-oxyhalogenated non-halopolymer is oxyhalogenated. That is, the surface is modified with molecularly bonded halogen atoms or a halocarbon or halohydrocarbon film, and at least a portion of the molecularly bonded halogen atoms or the halocarbon or halohydrocarbon film's surface halogen atoms are substituted with hydrogen atoms and oxygen atoms or oxygen-containing radicals. The method further includes evacuating the free volume of the surface-oxyhalogenated non-halopolymer, and infusing inorganic or organic molecules into the evacuated free volume of the surface-oxyhalogenated non-halopolymer.

The surface-oxyhalogenated non-halopolymer can be prepared by providing a surface-halogenated non-halopolymer which has natural free volume therein and which has a surface that is modified with molecularly bonded halogen atoms or a halocarbon or halohydrocarbon film. In a preferred embodiment, the surface-halogenated non-halopolymer's surface halogen atoms are modified by contacting the surface-halogenated non-halopolymer with a gas/vapor plasma mixture while exposing the surface-halogenated non-halopolymer to at least one radio frequency glow discharge under vacuum and under conditions effective to substitute at least a portion of the surface-halogenated non-halopolymer's surface halogen atoms with covalently bonded hydrogen atoms and oxygen atoms or oxygen-containing radicals.

Surface-halogenated non-halopolymers suitable for use in this method can be made by providing a non-halopolymer (which has free volume therein) and contacting the non-halopolymer's surface with halogen atoms or a halocarbon or halohydrocarbon material under conditions effective to molecularly bond halogen atoms or a halocarbon or halohydrocarbon film to the non-halopolymer's surface.

In cases where the surface-oxyhalogenated non-halopolymer includes a non-halopolymer having a surface that is modified with a halocarbon or halohydrocarbon film (as opposed, for instance, to molecularly bonded halogen atoms) and where both the non-halopolymer and the halocarbon or halohydrocarbon film have free volumes therein, the method can, optionally, further include evacuating the free volume of the halocarbon or halohydrocarbon film and infusing inorganic or organic molecules into the evacuated free volume of the halocarbon or halohydrocarbon film. In this manner, both the non-halopolymer and the halocarbon or halohydrocarbon film disposed thereon can be infused with the inorganic or organic molecules.

In another method for making a surface-oxyhalogenated non-halopolymer composite according to the present invention, a surface-halogenated non-halopolymer composite is provided. The surface-halogenated non-halopolymer composite includes a non-halopolymer having free volume therein and an inorganic or organic material disposed in the free volume of the non-halopolymer. The surface-halogenated non-halopolymer composite also has a surface that is modified with molecularly bonded halogen atoms or with a molecularly bonded halocarbon or halohydrocarbon film. The method further includes modifying the surface-halogenated non-halopolymer composite's surface halogen atoms under conditions effective to substitute at least a portion of the surface-halogenated non-halopolymer composite's surface halogen atoms with hydrogen atoms and oxygen atoms or oxygen-containing radicals. In a preferred embodiment, the surface-halogenated non-halopolymer composite's surface halogen atoms are modified by contacting the surface-halogenated non-halopolymer composite with a gas/vapor plasma mixture while exposing the surface-halogenated non-halopolymer composite to at least one radio frequency glow discharge under vacuum under conditions effective to substitute at least a portion of the surface-halogenated non-halopolymer composite's surface halogen atoms with covalently bonded hydrogen atoms and oxygen atoms or oxygen-containing radicals.

Surface-halogenated non-halopolymer composites suitable for use in the practice of this method of the present invention can be prepared, for example, by providing a surface-halogenated non-halopolymer having free volume therein and having a surface that is modified with molecularly bonded halogen atoms or a halocarbon or halohydrocarbon film. The surface-halogenated non-halopolymer's free volume is then evacuated, and inorganic or organic molecules are infused into the evacuated free volume of the surface-halogenated non-halopolymer.

In cases where the surface-halogenated non-halopolymer comprises a non-halopolymer having a surface that is modified with a halocarbon or halohydrocarbon film (as opposed to molecularly bonded halogen atoms) and where both of the non-halopolymer and the halocarbon or halohydrocarbon film have free volumes therein, the method can further include evacuating the halocarbon or halohydrocarbon film's free volume and infusing inorganic or organic molecules thereinto.

Alternatively, surface-halogenated non-halopolymer composites can be prepared by providing a non-halopolymer composite, which includes a non-halopolymer having natural free volume therein and an inorganic or organic material disposed in the natural free volume of the non-halopolymer. The non-halopolymer composite's surface is then contacted with halogen atoms or a halocarbon or halohydrocarbon film under conditions effective to molecularly bond the halogen atoms or a halocarbon or halohydrocarbon film to the non-halopolymer composite's surface. In this method, the non-halopolymer composite can be prepared by providing a non-halopolymer having natural free volume therein, evacuating the free volume of the non-halopolymer, and infusing inorganic or organic molecules into the evacuated free volume of the non-halopolymer.

The free volumes of the oxyhalopolymer, the halopolymer, the surface-halogenated non-halopolymer, the non-halopolymer, or the halocarbon or halohydrocarbon film (generically referred to herein as "polymer") which are evacuated and into which the inorganic or organic molecules are infused can be natural free volumes (i.e., free volumes which are neither created nor modified by exposure of the polymer to supercritical fluids under supercritical conditions prior to or during the evacuation or infusion). Preferred inorganic molecules are those which can be converted into inorganic materials which are resistant to diffusion, such as inorganic molecules which can be polymerized into macromolecular networks or which can be treated so that the inorganic molecules interact with the polymer's functionality. Suitable inorganic molecules include compounds and complexes of metal atoms (such as the alkali metals, the alkaline earths, the transition elements, the lanthanides, the actinides, boron, aluminum, gallium, indium, thallium, silicon, germanium, tin, lead, phosphorous, arsenic, antimony, bismuth, selenium, tellurium, polonium, and astatine, and, particularly in cases where they are bonded to other atoms via non-covalent bonds (e.g., ionic bonds and pi-pi bonds), carbon, nitrogen, sulfur, and iodine), especially V, W, Fe, Ti, Si, Al, P, Sb, As, Ba, B, Cd, Ca, Ce, Cs, Cr, Co, Cu, Ga, Ge, In, Pb, Mg, Hg, Mo, Ni, Nb, Re, Ta, Tl, Sn, Ir, Rh, Th, Ru, Os, Pd, Pt, Zn, Au, Ag, combinations thereof, and their ions. The ligands to which the metal atom or ion is bonded or complexed is not particularly critical, though it is preferred that the ligand be chosen so that the inorganic molecule be labile through exposure to oxidizing, hydrolyzing, hydrogenating, chemical, or electrochemical environments, as well as being labile through exposure to heat or actinic radiation, such as ultraviolet radiation. Suitable ligands include those disclosed above. Specific examples of inorganic molecules which can be used in the practice of the present invention include $VOCl_3$, $W(CO)_6$, $Fe(CO)_5$, $TiCl_4$, $SiCl_4$, $AlCl_3$, $PCl_3$, $SbCl_5$, $As(C_2H_5)_3$, $Ba(C_3H_7)_2$, borane pyridine and tetrahydrofuran complexes, $Cd(BF_4)_2$, $Ca(OOCCH(C_2H_5)C_4H_9)2$, cerium (III), 2-ethylhexanoate, cesium 2-ethylhexoxide, chromium (III) naphthenate, $CrO_2C_2$, $Co(CO)_3NO$, copper (II) dimethylaminoethoxide, triethylgallium, $GeCl_4$, triethylindium, lead napthenate, $C_2H_5MgCl$, $(CH_3)_2Hg$, $MoF_6$, $Ni(CO)_4$, $Nb(OC_2H_5)_6$, $HReO_4$, $Ta(OC_2H_5)_5$, $C_5H_5Tl$, $SnCl_4$, pi-allyl compounds of Group IIIa, IVa, Va, VIa, VIIa, or VIIIa metals, and combinations thereof.

Suitable organic molecules are those which can be converted into polymeric materials which are resistant to diffusion, such as macromolecular networks. Suitable organic molecules include compounds such as, acetylene, p-phenylene, thiophene, 2,5-thienylene, pyrrole, 2,5-pyrrolylene, 3-substituted 2,5-thienylene, 3-substituted pyrrole, aniline, p-phenyl-enevinylene, 2,5-pyridinediyl, hexadiyne, and diaceytylenes. All of these compounds can be diffused into the polymer and then oxidatively, chemically, or photochemically converted to their corresponding macromolecular complex so that they form a non-diffusible macromolecular network within the free volume of the polymer. Since macromolecular networks made from these organic molecules can be electrically or ionically conducting, infusion of these organic molecules can add varying degrees of electrical and/or ionic properties to the composite material as well as being capable of influencing the composite material's dielectric constant, coefficient of thermal expansion, density, permeability, and/or thermal coefficients of dielectric constant without significantly changing the crystallinity, flexibility, or Td of the starting polymer material. Aromatic organic molecules, such as napthalenes and pyridines can also be infused to add optical properties to these materials. However, these aromatic materials cannot be polymerized into macromolecular networks and, therefore, are not as stable with respect to diffusion out of the polymer, except in cases where they can complex with the polymer's functionality.

As indicated above, the free volume of the polymer (e.g., the free volume of the oxyhalopolymer, the halopolymer, the surface-halogenated non-halopolymer, the non-halopolymer, or the halocarbon or halohydrocarbon film) is first evacuated. As used herein evacuating means reducing the pressure in the free volume of the polymer to less than atmospheric pressure (i.e., less than 760 Torr). This can be carried out by placing the polymer in a chamber, vessel, or other container capable of withstanding the vacuum being employed and reducing the pressure in the chamber, vessel, or other container to less than about 760 Torr, more preferably from about 100 Torr to about 10 mTorr or less, and most preferably from about 1 Torr to about 10 mTorr or less. Evacuation is typically achieved in from about 1 minute to about several days, depending on temperature and pressure.

The free volume, thus evacuated, is then infused with the inorganic or organic molecules. In contrast to the methods of the prior art, the infusion here is preferably carried out under non-supercritical conditions (e.g., in the absence rather than in the presence of supercritical and carrier fluids, under conditions which do not produce created free volume and associated polymer swelling, and the like).

The infusion can be carried out by any practical method. Most conveniently, the infusion is carried out with the inorganic or organic molecule in a gaseous state by contacting the evacuated polymer with the gaseous inorganic or organic molecule. The inorganic or organic molecule can be naturally in the gaseous state, as is the case with some of the metal carbonyls, or the inorganic or organic molecules can be boiled, sublimed, or otherwise vaporized, such as with heat or under reduced pressure or both. In many cases the inorganic or organic molecules will be at least somewhat reactive with the air; in these cases, vaporization, as well as all other manipulations of the inorganic or organic molecules, are best conducted in an inert atmosphere, such as under argon or nitrogen, or in a vacuum.

The gaseous inorganic or organic molecule is then contacted with the evacuated polymer. This can be carried out by placing the polymer into a vessel, evacuating the vessel to a pressure less than 760 Torr, and then flowing the gaseous inorganic or organic molecules into the evacuated vessel containing the evacuated polymer. Infusion can be accelerated and, generally, more of the gaseous molecules can be infused by effecting the infusion process in a atmosphere of pure gaseous inorganic or organic molecules, preferably at elevated temperatures. The temperature and pressure at which the infusion is effected is important because they affect the time required for the infusion process. Temperature and pressure are preferably optimized within a range that allows the inorganic or organic materials to have vapor pressures of greater than zero and increases the concentration of amorphous regions within the polymer (which provides for more free volume).

It is believed that, by initially evacuating the vessel holding the polymer, the rate of infusion of the inorganic or organic molecules is enhanced, because the inorganic or organic molecules do not need to displace ambient gases residing in the polymer's free volume.

In a preferred embodiment of the present invention, infusion is carried out at temperatures greater than about 50° C. below that of the polymer's glass transition temperature ("Tg") and less than the thermal decomposition temperature ("Td") of the starting polymer material (i.e., at temperatures greater than about Tg −50° C. but less than about Td). The greater the temperature, the greater the rate of incorporation of the inorganic or organic molecules infused into the polymer. Also, the greater the temperature, the greater the resulting concentration of inorganic or organic material diffused into the polymer due to thermal rearrangement which acts to increase the free volume within the polymer. It is to be understood that these are only preferred conditions and that the same processes can be carried out outside of these preferred temperature ranges. In some cases, effecting infusion outside this temperature range may be preferred, such as to control the concentration of the inorganic or organic molecules in the finished composite. As the skilled practitioner will note, in order to practice the present invention in the preferred temperature range, the inorganic or organic molecule must have a non-zero vapor pressure at temperatures greater than about Tg −50° C. but less than about Td of the polymer and/or at the pressure used during the infusion process. In some cases, heating the polymer to temperatures which optimize free volume space may result in thermal decomposition of the inorganic or organic molecules one wishes to infuse into the polymer. In such cases, infusion is best carried out at temperatures and pressures at which the inorganic or organic molecules can achieve a vapor pressure of greater than zero but not thermally decompose. As indicated above, the time required for infusion varies depending on the temperature, the pressure, the nature of the inorganic or organic molecules, the nature of the polymer, the desired degree of infusion, the desired concentration of inorganic or organic molecules, and the like. In most circumstances, infusion can be effected in from about a few minutes to about 2 days.

After infusing the inorganic or organic molecules into the polymer, the inorganic or organic molecules can be polymerized under conditions effective to cause the inorganic or organic molecules to assemble into macromolecular networks. Preferably, the polymerization is carried out in the absence of free (i.e., non-infused) inorganic or organic molecules. Consequently, it is preferred that, prior to polymerization, the infused polymer be removed from the atmosphere containing gaseous inorganic or organic molecules or that the atmosphere surrounding the infused polymer be evacuated or replaced with an inert gas.

Polymerization can be carried out by exposing the inorganic or organic molecules infused in the free volume of the polymer to any suitable polymerizing condition. For example, the infused inorganic or organic material can be oxidized, hydrolyzed, hydrogenated, chemically treated, photoactivated, electrochemically polymerized, or thermally polymerized by exposing the infused inorganic or organic material to appropriate conditions, such as by exposing the infused inorganic or organic material to an oxidizing agent, a hydrolyzing agent, a hydrogenating agent, a specific chemical, actinic radiation, suitable voltages, or appropriate temperatures.

Typically, the oxidizing, hydrolyzing, or hydrogenating agent is gaseous or is contained in vapor form in an inert gas. For convenience, oxidation or hydrolysis can be effected by exposing the inorganic molecules to a gas which includes water, oxygen or combinations thereof, such as ambient air. The oxidation, hydrolysis, or hydrogenation can be carried out at any convenient temperature or pressure, preferably at room temperature and ambient pressure and at temperatures below the polymer's Td and the inorganic or organic molecules decomposition temperature. In the case where the inorganic or organic molecules are air or moisture sensitive, oxidation or hydrolysis can be conveniently carried out at ambient pressure and temperature and in ambient air in from about 5 min to about 48 hours.

Hydrogenation can be carried out by exposing the infused polymer to hydrogen gas. For example, a polymer containing a metal pi-allyl compound can be placed in an atmosphere of hydrogen gas at room temperature for from about 5 minutes to about 48 hours. The pi-allyl compound is reduced, propane gas is released, and a stabilized metal species or a metal network is formed in the free volume of the polymer. In the case where a metal network is formed in the polymer's free volume, the metal network may or may not interact with functionalities contained within the polymer.

In some cases polymerization can be carried our chemically. For example, organic molecules of pyrrole can be infused into the polymer's free volume and then converted to polypyrrole by contacting the polymer material with a chemical solution containing 50% water and 50% $HNO_3$. This solution oxidizes the pyrrole to a macromolecular network of polypyrrole which resides throughout the free volume of the polymer. Alternatively, the polymer can be first converted to a composite as described herein such that the macromolecular network contained in the polymer has oxidative properties. One suitable macromolecular network having oxidative properties is $V_2O_5$. After formation of this composite containing $V_2O_5$, organic molecules like pyrrole can be infused, which then are oxidized by the $V_2O_5$ macromolecular network to form a macromolecular polypyrrole network within the polymer's free volume.

Organic monomers which can be electrochemically polymerized, such as acetylene or thiophene, once infused into the free volume of the polymer, can be polymerized by contacting the infused polymer with an electrode and adjusting the potential of the electrode to facilitate oxidative polymerization of the organic molecules.

As a further example, thermal treatment of the organic molecule $C_6H_4$—$CH_2$—$(R_2$—$S^+X^-)$—$CH_2$— facilitates polymerization to the macromolecular polymer polyphenylenevinylene. (See, for example, Yamamoto, which is hereby incorporated by reference.)

Once polymerized, the inorganic or organic molecules self-assemble into macromolecular networks over a period of time ranging from simultaneous assembly upon exposure to the polymerizing conditions to a few hours to a few days.

The assembled macromolecular network can, optionally, be infused with dopants, such as Na, $I_2$, $Br_2$, $FeCl_3$, $AlCl_3$, $AsF_5$, and those disclosed in Yamamoto, which is hereby incorporated by reference, to enhance the conductive properties of the macromolecular network contained within the free volume of the polymer. Further description of these processes and their utility in making, for example, polymeric batteries, electrolytic capacitors, electrochromic devices, diodes, solar cells, and non-linear optic materials, can be found in Yamamoto, which is hereby incorporated by reference.

It is believed that, because the inorganic or organic molecules which are diffused into the polymer are confined to the polymer's free volume, the resulting self-assembled macromolecular networks are mainly limited to extending lengthwise (i.e., only a monolayer to a few layers of the network can form in two dimensions and the growth of the network is mainly through a one dimensional extension of a single monolayer chain through the interconnected free volumes contained within the polymer). It is further believed that this results in a material whose polymer phase is relatively unchanged with respect to flexibility, crystallinity, Td, and other physical properties. In essence, the polymer is believed to act only as a molecular template into which the inorganic network is formed along the free volume space associated with these materials. However, since the inorganic or organic macromolecular network is contained in free volumes which are homogeneously incorporated throughout the polymer, it imparts its own properties to the composite as a whole. Such imparted properties include controlled and varying optical densities, catalytic properties, and electrical and ionic conductivities, as well as enhanced thermal-mechanical properties.

Alternatively, particularly in cases where the polymer contains a suitable functionality (e.g., an oxyhalopolymer or halopolymer), the infused inorganic or organic molecules can be treated under conditions effective to cause the inorganic or organic molecules to interact with the polymer's functionality. As described above, suitable polymer functionalities include halogens (such as fluorines or chlorines), amines, alkenes, alkynes, carbonyls (such as keto groups, aldehyde groups, carboxylic acid groups, ester groups, amide groups, and the like), alcohols, and thiols. Inorganic molecules which are interacted with functionalities on the polymer can have the formula $M^y X_j$, where X is a functionality contained within the polymer (e.g., halogen, such as F or Cl, $NH_2$, NH, O—C=O, C—OH, C=C, C≡C, or C=O), y is the oxidation state of the metal, which can range from zero to the highest oxidation state of the particular metal, and j is the number of ligands to which the particular metal can ligate within a given polymer. For example, where M is Pd, and X is Cl, j can be 2. In cases where the inorganic or organic molecules contain metal atoms or ions, the interacted metal and polymer functionality can generally be characterized as an inorganic complex, although other types of interactions, such as covalent interactions, ionic interactions, pi-pi electronic interactions, and the like are also contemplated.

The interaction between the inorganic or organic material can be spontaneous, i.e., it can occur immediately or over a period of time simply by virtue of the inorganic or organic material being in close proximity with the polymer's functionality. In this case, treating simply means permitting the inorganic or organic molecules to interact with the polymer's functionality. In other cases, the interaction between the inorganic or organic material is not spontaneous and requires that the inorganic or organic molecules be actively treated, such as by oxidizing, hydrolyzing, hydrogenating, chemically treating, or photoactivating, electrochemically activating, the infused inorganic or organic molecules. The oxidized, hydrolyzed, hydrogenated, chemically treated, photoactivated, electrochemically activated inorganic or organic molecules then go on to interact with the functionality of the polymer. In practicing this aspect of the present invention, oxidizing, hydrolyzing, hydrogenating, chemically treating, or photoactivating, electrochemically activating the infused inorganic or organic molecules can be carried out by the methods described above in regard to polymerizing the inorganic or organic molecules.

In some cases, most notably in the cases where the inorganic molecules contain metal atoms and ligands bonded thereto where the metal ligand bond strength is large, oxidation, hydrolysis, or hydrogenation of the ligands may be slow or incomplete. For comparisons of metal ligand bond strength and the tendency for metals to hydrolyze see Huheey, *Inorganic Chemistry*, 3rd *Edition, Principles of structure and reactivity*, New York:Harper and Row, Chapters 7 and 11,which is hereby incorporated by reference. In these cases, it is advantageous to expose the inorganic molecules to actinic radiation, such as ultraviolet ("UV") radiation, preferably a broad band source of about 190 nm to about 400 nm, (or, in some cases, high energy UV (e.g., wavelengths less than 190 nm) or x-radiation), under conditions effective to cleave the ligands from the metal atoms, typically for a period of time related to the strength of the metal ligand bond and the power output (i.e., power density) of the radiation source.

The metal atoms having the ligands cleaved therefrom can be treated photochemically, chemically, electrochemically, or thermally under conditions effective to cause the metal atoms to interact with the polymer's functionality.

Alternatively, the metal atoms having the ligands cleaved therefrom can then be exposed to an oxygen or water containing gas under conditions effective to cause the metal atoms to assemble into macromolecular networks. An oxygen or water containing gas or atmosphere is preferably present while exposing the inorganic molecules (diffused into the polymer) to actinic radiation, so that oxidation or hydrolysis can occur immediately upon cleavage of the ligand from the metal. Oxygen or water containing gases suitable for use in this process include: substantially pure oxygen; oxygen mixed with water and/or an inert gas, like Ar or $N_2$; or ambient air.

For example, $W(CO)_6$ is a tungsten metal complex which contains 6 carbonyl ligands. The carbonyl ligands are labile to heat or UV radiation. However, their lability decreases with the loss of each carbonyl ligand. In other words, upon loss of the first carbonyl, the second carbonyl becomes more difficult to remove; upon loss of the second carbonyl, the third carbonyl becomes more difficult to remove; and so on. Thus, after infusion of $W(CO)_6$ into a polymer, loss of the carbonyl ligands is preferably carried out by activating the tungsten-carbonyl bond by exposure to a broad band ultraviolet source (e.g., radiation between 190 nm and 400 nm) to facilitate the total decomposition of the $W(CO)_6$. The decomposed tungsten complex is then free to interact with the polymer's functionality or to react with neighboring decomposed tungsten complexes to form a macromolecular tungsten oxide network.

It is believed that the foregoing polymerization of the inorganic or organic molecules and assembly into macromolecular networks and/or the foregoing treatment of the inorganic or organic molecules to cause their interaction with the polymer's functionality results in improved stability of the complex, such as, for example, by reducing migration of the inorganic or organic molecules out of the free volume of the polymer.

The oxyhalopolymers and oxyhalopolymer composites and the surface-oxyhalogenated non-halopolymers and surface-oxyhalogenated non-halopolymer composites can be prepared, repectively, from halopolymers and halopolymer composites and from surface-halogenated non-halopolymers and surface-halogenated non-halopolymer composites by a variety of techniques.

A variety of methods for incorporating reactive oxygen functionality onto halopolymers are available and useful for this invention. These methods include plasma and corona discharge treatments, ion beam and electron beam bombardment, x-ray and gamma ray treatments, as well as a variety of wet chemical processes including treatments with sodium in liquid ammonia or sodium naphthalene in glycol ether or surface reduction with benzoin dianion. All of the above methods are described in detail in Lee et al., "Wet-process Surface Modification of Dielectric Polymers: Adhesion Enhancement and Metallization," *IBM J. Res. Develop.*, 38(4) (July 1994), Vargo et al., "Adhesive Electroless Metallization of Fluoropolymeric Substrates" *Science*, 262:1711–1712 (1993), "Rye et al., "Synchrotron Radiation Studies of Poly(tetrafluoroethylene) Photochemistry," *Langmuir*, 6:142–146 (1990), and Tan et al., "Investigation of Surface Chemistry of Teflon. 1. Effect of Low Energy Argon Ion Irradiation on Surface Structure," *Langmuir*, 9:740–748 (1993), which are hereby incorporated by reference.

For example, one suitable method for introducing oxygen functionality involves exposing the surface halogen atoms of the halopolymer or halopolymer composite or the surface-halogenated non-halopolymer or surface-halogenated non-halopolymer composite to actinic radiation, e.g., ultraviolet, X-ray, or electron beam radiation, in the presence of oxygen-containing organic compounds commonly referred to as "organic modifiers". Examples of suitable organic modifiers include sodium 4-aminothiophenoxide ("SATP"), sodium benzhydroxide ("SBH"), disodium 2-mercapto-3-butoxide ("DDSMB"), and other strong reducing agents which facilitate hydrogen or halogen abstraction in the presence of actinic radiation. In practice, the halopolymer or halopolymer composite or the surface-halogenated non-halopolymer or surface-halogenated non-halopolymer composite is immersed into one or more of the organic modifiers and simultaneously exposed to actinic radiation, such as UV radiation, for a prescribed length of time. Further details with regard to this method of introducing oxygen functionality is described in, for example, U.S. Pat. No. 5,051,312 to Allmer, which is hereby incorporated by reference.

Preferably, the oxyhalopolymer or oxyhalopolymer composite or the surface-oxyhalogenated non-halopolymer or surface-oxyhalogenated non-halopolymer composite is prepared by introducing oxygen functionality onto the surface of the corresponding halopolymer or halopolymer composite or surface-halogenated non-halopolymer or surface-halogenated non-halopolymer composite by RFGD of a gas-vapor under vacuum.

Briefly, the halopolymer or halopolymer composite or surface-halogenated non-halopolymer or surface-halogenated non-halopolymer composite in an atmosphere of a gas/vapor mixture is exposed to a single or series of radio frequency glow discharges ("RFGD") at power loadings of less than or equal to 100 watts and pressures of under 1 Torr, more preferably, from about 50 to 200 mTorr.

Although not wishing to be held to any precise mode of action, the primary mechanism of the plasma treating process of the instant invention is believed to involve the transfer of energy to the gaseous ions directly to form charged ionized gas species, i.e., ion sputtering of the polymer at the gas-solid interface. The radio frequency glow discharge plasma gas ions become excited through direct energy transfer by bombarding the gas ions with electrons. Thus, by exposing the halopolymer or halopolymer composite or surface-halogenated non-halopolymer or surface-halogenated non-halopolymer composite to either a single or a series of radio frequency glow discharge gas/vapor plasmas, from about 1% to about 98% of the surface halogen atoms are permanently removed in a controlled and/or regulated manner and replaced with hydogen atoms along with oxygen atoms or low molecular weight oxygen-containing radicals. Suitable gas vapor plasmas include those containing admixtures of hydrogen gas, preferably ranging from about 20% to about 99%, by volume, and about 1% to about 80%, by volume, of a liquid vapor, such as liquid vapor of water, methanol, formaldehyde, or mixtures thereof. Although hydrogen is required in all instances, by itself, hydrogen is insufficient to introduce both hydrogen and oxygen moieties into the carbon polymer backbone. A nonpolymerizable vapor/$H_2$ mixture is necessary to introduce the required hydrogen and oxygen or functionalized moieties into the halopolymer without disrupting surface morphology. Use of pure gas mixtures, specifically $H_2/O_2$, gave inferior results. Representative radio frequency glow discharge plasmas and operating conditions are provided in Table 1 below.

TABLE 1

| Starting Material | RFGD Mix Composition | Pressure (mTorr) | Time (min.) | Depth (A) | CALCULATED ATOMIC RATIOS (ESCA) | | | Stoichiometry |
|---|---|---|---|---|---|---|---|---|
| | | | | | C/O | C/F | F/O | |
| Unmodified PTFE | — | — | — | — | ∞ | 0.45 | ∞ | $C_2F_{33}$ |
| Unmodified PVDF | — | — | — | — | ∞ | 1.0 | ∞ | $C_1F_1$ |
| Modified PTFE | 2% $H_2O$ 98% $H_2$ | 150 | 20 | 100 | 7.5 | 1.5 | 5.0 | $C_{15}F_{10}H_{18}O_2$ |
| Modified PTFE | 2% $H_2O$ 98% $H_2$ | 200 | 10 | 100 | 8.6 | 0.91 | 9.7 | $C_{17}F_{19}H_{13}O_2$ |
| Modified PTFE | 20% MeOH (g) 80% $H_2$ | 150 | 30 | 100 | 3.0 | 1.5 | 2.0 | $C_6F_4H_6O_2$ |
| Modified PTFE | 20% MeOH (g) 80% $H_2$ | 200 | 5 | 100 | 9.3 | 2.0 | 4.7 | $C_{28}F_{14}H_{39}O_2$ |
| Modified PVDF | 2% $H_2O$ 98% $H_2$ | 200 | 10 | 100 | 8.0 | 16.0 | 0.48 | $C_{16}F_1H_{29}O_2$ |

Through specific and controlled addition of oxygen functionality via radio frequency glow discharge, the oxyhalopolymer composites and surface-oxyhalogenated non-halopolymer composites disclosed herein may remain resistant to fouling and adsorption of substances, a property which is consistent with the unmodified halopolymer composites. However, unlike unmodified halopolymer composites, such as PTFE composites, it was found that the oxyhalopolymer composites have the unique ability to react cleanly and rapidly with various atoms, molecules, or macromolecules through the oxygen containing groups (e.g., hydroxyl, carboxylic acid, ester, aldehyde, and the like) on the oxyhalopolymer composite surface to form refunctionalized oxyhalopolymer composites. This is especially advantageous because generally halopolymer composites are inert to wet and physical-chemical surface processes, at least to those which do not also induce substantial surface morphological damage. In addition, due to the relative inertness of oxyhalopolymer composite surfaces, the ability to incorporate reactive functionality onto their surfaces creates a material which is specifically and controllably reactive while also being inert to other chemical and environmental concerns, e.g., adsorption of surface contaminants.

Further details with regard to this method are described in, for example, U.S. Pat. Nos. 4,946,903, 5,266,309, and 5,627,079, all to Gardella, Jr. et al. (collectively, "Gardella") and applicants' copending U.S. patent application Ser. No. 08/689,707 ("the '707 Application"), which are hereby incorporated by reference.

The surfaces of non-halopolymers and non-halopolymer composites can be halogenated by a variety of techniques. For example, halogenation can be carried out by adding fluorine or fluorocarbon coatings in the form of films. Non-halopolymers, such as the polyolefins, for example, can have their surfaces halogenated by either gasphase surface halogenation processes, or, alternatively, they can be coated with a fluorocarbon based plasma film. Both processes are well known and documented in the prior art. Typically, with gas phase fluorination, non-halopolymers are exposed to a mixture of fluorine and nitrogen, whereby fluorine atoms become bonded to the polymer surface at the molecular level. Lagow et al., "Direct Fluorination: A 'New' Approach to Fluorine Chemistry," in Lippard, ed., *Progress in Inorganic Chemistry*, vol. 26, pp. 161ff (1979), which is hereby incorporated by reference, discloses methods of gas phase surface fluorination for providing antireflective, low surface energy films to various commercially available base polymers, such as highly cross-linked polyethylene, polypropylene, poly(methyl methacrylate), polycarbonate, polyester, polystyrene, and polymethylpentene. Clark et al., "Applications of ESCA to Polymer Chemistry. 6. Surface Fluorination of Polyethylene—Application of ESCA to Examination of Structure as a Function of Depth," *J. Polym. Sci., Polymer Chem. Ed.*, 13:857–890 (1975), which is hereby incorporated by reference, also discloses the surface fluorination of high density polyethylene films. Other suitable gas phase fluorination methods are described in, for example, U.S. Pat. Nos. 3,988,491 and 4,020,223 to Dixon et al., which are hereby incorporated by reference.

Methods for preparing fluorocarbon plasma deposited films are also well documented in the literature. For instance, Haque et al., "Preparation and Properties of Plasma-Deposited Films With Surface Energies Varying Over a Wide Range," *J. App. Polym. Sci.*, 32:4369–4381 (1986), which is hereby incorporated by reference, discloses suitable methods for modification of polymer surfaces with plasma deposited thin films using a capacitatively coupled RF-discharge system. Representative useful fluorinated gaseous materials include hexafluoroethylene, perfluoropropane, and hexafluoropropene. Nakajima et al, "Plasma Polymerization of Tetrafluoroethylene," *J. App. Polym. Sci.*, Vol. 23, 2627–2637 (1979), which is hereby incorporated by reference, discloses methods for applying plasma polymerized fluorocarbon coatings which can be utilized for generating surfaces having, for example, low dielectric and non-corrosive properties. U.S. Pat. No. 4,718,907 to Karwoski et al., which is hereby incorporated by reference, describes useful methods for introducing fluorinated coatings for vascular grafts and other biomedical technologies. Alternatively, thin (about 0.5 μm to about 50 μm) or thick (about 50 μm to several mm) halopolymer (e.g., PTFE, PVDF, PFA, MFA, ECTFE, and PCTFE) films can be bonded to the non-halopolymers or non-halopolymer composites, for example, by methods which are well known in the art.

Optionally, the oxyfluoropolymer composite or the surface-oxyhalogenated non-halopolymer composite of the present invention can be refunctionalized. The types of functionalities with which the oxyfluoropolymer composite's or the surface-oxyhalogenated non-halopolymer composite's surfaces can be refunctionalized include all those which can be reacted with hydroxyl, carboxylic acid, ester, and aldehyde groups bonded through the halopolymer backbone or surface halogen atom by means of reactions generally familiar among those skilled in the art. The reactivity of the surface of the oxyhalopolymer composite is determined by the particular type of oxygen functionality. For instance, silanes of the silicon-containing organic or inorganic class react vigorously with hydroxyl groups forming a silanol linkage or coupled bond. However, the rate of reaction is enhanced even further due to the close proximity of the reactive oxygen functionality to the electronegative halogen atom(s). This is believed to provide for extremely rapid reaction rates through stabilization of the oxygen anion. The preferred refunctionalized oxyhalopolymer composites or surface-oxyhalogenated non-halopolymer composites can be prepared with a wide range of organosilane coupling agents having the general Formula I:

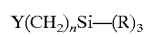

wherein Y is selected from the group consisting of allyl, alkyl haloalkyl, amino, mercapto, epoxy, glycidoxy, methacrylate, cyano, and —$CH_2CO_2$-alkyl; n is from 0 to about 17; and R is independently selected from hydrogen, halogen, alkyl, haloalkyl, alkylamino, alkoxy, and trialkylsiloxy. The silane coupling agents are known materials which are commercially available, such as from Petrarch Systems, Bristol, Pennsylvania.

The process of preparing the organosilicon substituted oxyhalopolymer composites or surface-oxyhalogenated non-halopolymer composites can be illustrated by the following reaction:

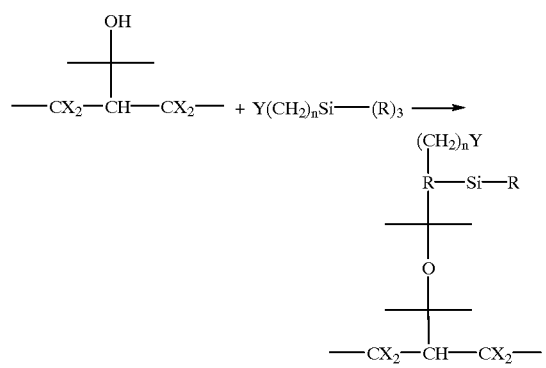

wherein X is halogen (e.g., F or Cl), and R, Y, and n are the same as in Formula I. In the above reaction scheme, the first reactant represents the oxyhalopolymer composite surface or the surface-oxyhalogenated non-halopolymer composite surface, and the second reactant is the organosilane coupling agent set forth above having Formula I. Preferably, the refunctionalized oxyhalopolymer composites and surface-oxyhalogenated non-halopolymer composites are prepared using organosilane coupling agents in which Y is alkylamino, dialkylamino, mercapto, or glycidoxy and in which R is chlorine, bromine, fluorine, alkyl having from 1 to 4 carbon atoms, chloromethyl, monoethylamino, dimethylamino, methoxy, ethoxy, propoxy, butoxy, or trimethylsiloxy. Specific representative organosilanes are 3-aminopropyltriethoxysilane, 3-mercaptopropyltrimethoxysilane, and 3-glycidoxypropyltrimethoxysilane to name but a few.

Other particularly useful functionalities which may be covalently bonded with the oxyfluoropolymer composites and surface-oxyhalogenated non-halopolymer composites of the present invention through their reactive oxygen-containing sites include fluorophores. As used herein, fluorophores include organic compounds that may fluoresce. The preferred fluorophores are the isothiocyanate substituted types, such as fluorescein isothiocyanate ("FITC"), malachite green isothiocyanate, rhodamines (e.g., tetramethylrhodamine isothiocyanate ("TRITC")), and the like. Other suitable isothiocyanate substituted fluorophores are described in Haughland, *Handbook of Fluorescent Probes and Research Chemicals*, Molecular Probes, Inc. (1989), which is hereby incorporated by reference and are available from Molecular Probes, Inc. Oxyhalopolymer composites and surface-oxyhalogenated non-halopolymer composites that are refunctionalized with isothiocyanate substituted fluorophores are especially useful in a side variety of probes and sensors, such as for nucleic acids.

In addition to the organosilicon and fluorophore refunctionalized oxyhalopolymer composites and surface-oxyhalogenated non-halopolymer composites, other representative examples include alkali metal derivatives of the oxyhalopolymer composites and surface-oxyhalogenated non-halopolymer composites, such as those having the formula:

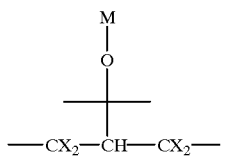

where M is an alkali metal (e.g., Li, Na, and K), and X is a halogen, particularly F. These oxyhalopolymer composites and surface-oxyhalogenated non-halopolymer composites can be prepared, for example, by reacting solutions of alkali metal hydroxide (e.g., LiOH, NaOH, KOH, and combinations thereof) with the oxygen containing groups of the oxyhalopolymer composites and surface-oxyhalogenated non-halopolymer composites. The alkali metal oxyhalopolymer composites and surface-oxyhalogenated non-halopolymer composites are useful as cell separators in electrochemical cells, such as energy producing cells (e.g., batteries).

Further details with respect to refunctionalization can be found in, for example, U.S. Pat. No. 5,266,309 to Gardella, Jr. et al., which is hereby incorporated by reference. As used herein, the oxyhalopolymers, oxyfluoropolymer composites, surface-oxyhalogenated non-halopolymers, and surface-oxyhalogenated non-halopolymer composites of the present invention are meant to include those which contain oxygen or oxygen-containing radicals which have been refunctionalized as described above.

The oxyfluoropolymer composite or the surface-oxyhalogenated non-halopolymer composite of the present invention can, optionally, be metallized with one or more transition metals. The transition metals are bonded, preferably covalently, to the oxyfluoropolymer composite or the surface-oxyhalogenated non-halopolymer composite via the oxygen or oxygen-containing radicals which substitute for surface halogen atoms of the oxyfluoropolymer composite or the surface-oxyhalogenated non-halopolymer composite. When metallized as described herein, the oxygen or oxygen-containing radicals are preferably present not only at the immediate surface but also to a depth of from about 10 Å to about 200 Å. This will form a molecular layer of the transition metal bonded, preferably covalently, to the oxygen sites or a multi-molecular film of transition metal from about 10 Å to more than about a micron in thickness stabilized by an initial molecular layer of transition metal. The oxyfluoropolymer composites and the surface-oxyhalogenated non-halopolymer composites of the present invention are meant to include those which contain oxygen or oxygen-containing radicals that have been metallized as described above. The metallized oxyhalopolymer composites and surface-oxyhalogenated non-halopolymer composites of the present invention may, hereinafter, be referred to as metallohalopolymers ("MHPs").

Representative MHPs include those which contain, at the surface thereof, one or more repeating non-terminal units having the formulae:

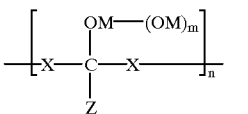

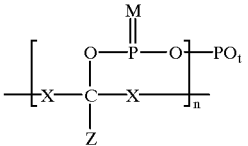

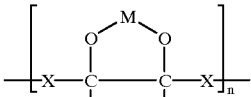

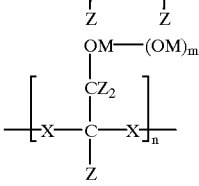

and

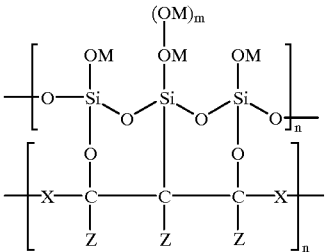

wherein M is a transition metal; Z a halogen (e.g., fluorine, chlorine), hydrogen, —$(CH_2)_y CH_3$, —$CH_3$ or —OR; R is hydrogen, —(CH$_2$)$_y$CH$_3$, or —CH$_3$; y is 1 to 20; X is a methylene group optionally substituted with one or two halogen atoms (e.g., CF$_2$, CFCl, CCl$_2$, CFH, CClH, and CH$_2$); n is 10 to 1000; t is 2 to 3; and m is 0 to 1000.

The metals are capable of being covalently bonded in controlled amounts, and with predetermined valences. The concentration of transition metal introduced into the polymer may be controlled, for example, by kinetics where the reaction speed depends on a variety of conditions including, (i) the solution chemistry utilized; (ii) the binding strength of the ligand on the organometallic complex starting material which is dissociated during the reaction to form the MHP, and (iii) the use of gas phase as opposed to solution phase (e.g., solution phase could react to form metallooxo functional groups at the oxyfluoropolyer surface whereas a chemical vapor deposition could react to form both a metallooxo bond plus deposit an additional overlayer of metal onto the metallooxo functionality).

Alternatively, metal concentration of the MHP may be controlled by the amount of oxygen functionality initially present in the starting oxyfluoropolymer material which can be controlled by methods described in Gardella and in U.S. Pat. No. 5,051,312 to Allmer, which are hereby incorporated by reference.

Methods for controlling the oxidation state of the metal of the MHP are also varied. For instance, one can construct a Rh$^{+3}$ MHP according to the invention by depositing rhodium from an aqueous solution containing RhCl$_3$ wherein the oxidation state of the rhodium in the starting organometallic complex is +3. Alternatively, a RH$^\circ$ MHP can be made by depositing RhCl$_3$ from a solution containing ethanol. In this case, the Rh$^{+3}$ of the starting organometallic complex is reduced by the presence of alcohol during the reaction to the oxyhalopolymer composite or surface-oxyhalogenated non-halopolymer composite in order to form the Rh$^\circ$ MHP. Thus, in this case, control of the oxidation state may be achieved by adding an appropriate reducing agent to the reaction solution which will effectively lower the oxidation state of the starting metal contained in the organometallic starting material.

In general, the oxidation state of the metal contained in the organometallic starting material can be preserved and, thus, further controlled by choosing an organometallic starting material containing the transition metal in the desired oxidation state. Thus, for example, to make a MHP with Cu$^{+2}$, a CuCl$_2$ organometallic starting material could be reacted with an oxyhalopolymer composite or a surface-oxyhalogenated non-halopolymer composite by exposing the oxyfluoropolymer composite or a surface-oxyhalogenated non-halopolymer composite to a millimolar solution of CuCl$_2$ in a suitable solvent (e.g., dimethylformamide ("DMF"). A Cu$^{+1}$ MHP could be prepared by exposing an oxyfluoropolymer to a millimolar solution of CuSCN in 0.5M NH$_4$OH. Cu$^\circ$ MHP may be prepared by adding an effective reducing agent to the reaction solutions or by immersing Cu$^{+1}$ or Cu$^{+2}$ MHP materials in a bath containing an appropriate reducing agent for copper, such as NaBH$_4$.

A further alternative for controlling the oxidation state of the transition metal of the MHPs of this invention comprises utilizing the strength of the ligands making up a particular organometallic complex starting material. For example, Cr(CO)$_6$ (chromium hexacarbonyl) represents Cr in a zero oxidation state. The carbonyl ligands are relatively weakly bound, so that all six of them can be liberated during the reaction with an oxyhalopolymer composite or a surface-oxyhalogenated non-halopolymer composite to yield a Cr$^{+6}$ MHP. Alternatively, tristrialkylphosphine chromium (III) chloride ((PR$_3$)$_3$ CrCl$_3$) has three labile chlorine ligands and three relatively stable trialkylphosphine ligands. Upon reacting with an oxyfluoropolymer, the chromium in tristrialkylphosphine chromium (III) chloride loses the three chlorine ligands but retains the three trialkylphosphines. As a result a Cr$^{+3}$ MHP is produced.

It will be understood that above-described refunctionalization or metallization processes can take place at any stage of the aforedescribed process of the present invention for making the oxyhalopolymer composite or the surface-oxyhalogenated non-halopolymer composite once the oxygen functionality has been introduced onto the polymer composite's or polymer's halogen or halogenated surface. For example, metallization or refunctionalization can be carried out on the oxyhalopolymer composite or the surface-oxyhalogenated non-halopolymer composite. Alternatively, metallization or refunctionalization can be carried out subsequent to modifying surface halogens of the halopolymer or surface-halogenated non-halopolymer but prior to evacuating and infusing with the inorganic or organic material. In some cases, depending on the nature of the infused inorganic or organic material, metallization (or refunctionalization) and infusing can be carried out in one step simply by contacting the evacuated oxyhalopolymer or surface-oxyhalogenated non-halopolymer with the inorganic or organic material under conditions that are effective to both infuse the inorganic or organic material into the evacuated free volume and react with the surface oxygen or oxygen-containing radicals.

Further details with regard to metallization of halogenated surfaces containing covelently bonded oxygen or oxygen-containing radicals can be found in, for example, applicants' copending '707 Application, which is hereby incorporated by reference. Applicants' copending '707 Application, which is hereby incorporated by reference, also describes the uses to which the metallized oxyhalopolymer composite or the metallized surface-oxyhalogenated non-halopolymer composite of the present invention can be put.

Metallization and refunctionalization of the oxyhalopolymer composite or the surface-oxyhalogenated non-halopolymer composite can be either over the entire exposed surface or on selected regions. For example, the regions selected for metallization or refunctionalization can be in the form of a predetermined pattern. Metallization and refunctionalization in predetermined patterns can be effected by using oxyhalopolymers, oxyhalopolymer composites, surface-oxyhalogenated non-halopolymers, or surface-oxyhalogenated non-halopolymer composites whose surface halogen atoms are substituted with oxygen or oxygen-containing radicals in the desired predetermined pattern. These patterned oxyhalopolymers, oxyhalopolymer composites, surface-oxyhalogenated non-halopolymers, or surface-oxyhalogenated non-halopolymer composites can be produced by masking the halopolymer, halopolymer composite, surface-halogenated non-halopolymer, or surface-halogenated non-halopolymer composite and introducing oxygen functionalities into the halogen or halogenated surface thereof, such as by RFGD of a gas vapor. After exposure of the masked halopolymer composite or halopolymer or the masked surface-halogenated non-halopolymer composite or surface-halogenated non-halopolymer, only the unmasked portions have oxygen or oxygen-containing radicals at the surface. When the patterned oxyhalopolymer composites or oxyhalopolymers or the patterned surface-oxyhalogenated non-halopolymer composites or surface-oxyhalogenated non-halopolymers are exposed to metallizing or refunctionalizing conditions, as described above, metallization or refunctionalization takes place only in those regions which have oxygen or oxygen-containing radicals at the surface.

In cases where a non-halopolymer is used, the metallized or refunctionalized pattern can also be controlled by using a non-halopolymer which is modified, in the predetermned pattern, with molecularly bonded halogen atoms or a halocarbon or halohydrocarbon film. When oxygen functionality is introduced into such a surface-halogenated non-haloplymer, only those portions of the non-halopolymer surface that have been surface-halogenated will have oxygen or oxygen-containing radical, and, therefore, upon metallization or refunctionalization, a patterned metallized or refunctionalized surface-oxyhalogenated non-halopolymer composite or a patterned metallized or refunctionalized surface-oxyhalogenated non-halopolymer is produced. As is implicit in the above discussion, modification of the non-halopolymer substrate's surface with molecularly bonded halogen atoms or a halocarbon or halohydrocarbon film in the predetermned pattern can take place before or after evacuation and infusion of the organic or inorganic materials.

Methods pertaining to patterning include conventional photoresist based photolithography, in which the modified halogenated surface is coated with a photoresist material, exposed to radiation, and developed to expose a pattern. The exposed patterns are then reacted with a preferred material (e.g., organometallic species), vapor deposited metals (including oxides, nitrides, etc., thereof), organic molecules, biological molecules, or polymers), and the unexposed photoresist material is removed through conventional methods to produce a patterned surface. Further details regarding this method can be found in, for example, Moreau, *Semiconductor Lithography—Principles, Practices, and Materials*, New York:Plenum Press (1988) (particularly Chapters 8 & 9 (pp. 365–458)), which is hereby incorporated by reference.

Additionally, the halogenated surface can be reacted with photolabile chemical functionality which, upon using conventional masking techniques and exposure to actinic radiation, produces selective sites which are capable of bonding organometallic species, vapor deposited metals (including oxides, nitrides, suicides, and borides, etc., thereof), organic molecules, biological molecules, or polymer species only to the exposed regions which become active towards refunctionalization. Details with respect to this method can be found in, for example, U.S. Pat. Nos. 5,077,085 and 5,079,600 to Schnur et al., which are hereby incorporated by reference.

The composites of the present invention contain polymeric phases which have physical properties substantially similar to the properties of the native polymer (i.e., polymer in the absence of inorganic or organic molecules or macromolecular networks). Consequently, the composites of the present invention, relative to conventional inorganic-organic hybrid materials, have significantly more predictable mechanical properties. The composites of the present invention also have controllable, predictable, and reproducible levels of optical densities and electrical, ionic, and charged species conductivities, which make them useful in various applications including photoradiation shields and filters, electromagnetic radiation shields and filters, and conducting electrodes. These characteristics also make these composites useful as components in the construction of electrolytic cells, fuel cells, optoelectronic devices, semiconductors for microelectronic applications, materials having flame and heat retardant properties, coatings which inhibit fouling by organisms, and heterogeneous catalytic substrates. When the composite of the present invention is used as a catalyst, it is sometimes desirable to swell the composite during or before its use as a catalyst to increase the rate of diffusion of reactant into the composite. This can be carried out by exposing the composite to standard supercritical conditions. For example, the composite can be placed in a vessel capable of withstanding high pressures, such as the pressures commonly encountered in supercritical catalytic processes. The vessel is then charged with a supercritical fluid under supercritical conditions, such as carbon dioxide at 2500 psi, and the pressure is maintained for a period of time ranging from 1 to 100 hours. As a result of being exposed to these supercritical conditions, the composite swells. However, in contrast to the materials of the prior art in which impregnation is carried out under supercritical conditions, the inorganic or organic materials infused in accordance with the methods of the present invention do not diffuse out of the polymer upon the composite's subsequent exposure to supercritical conditions. Details with respect to these uses are set forth in applicants' copending U.S. patent application Ser. No. 08/833,290; U.S. patent application Ser. No. 08/955,901; and U.S. Provisional Patent Application Serial No. 60/039,258, which are hereby incorporated by reference.

In addition, the composites of the present invention have a surface containing halogen atoms, a portion of which have been replaced with hydrogen atoms and oxygen atoms or oxygen-containing groups. The oxyhalopolymer or surface-oxyhalogenated non-halopolymer surface retains many of the positive attributes characteristic of halogenated surfaces, such as tendency to repel water and other polar solvents, high thermal stability, low adhesion and friction coefficients. However, unlike halogenated surfaces, the surfaces of the oxyhalopolymer composites and surface-oxyhalogenated non-halopolymer composites of the present invention have reactive chemical sites which are either bonded to or permit bonding with other chemical functionalities, such as organosilicons, organometallic precursors, transition metal ions and compounds, transition metal films, fluorescent compounds, dyes, biological materials, such as proteins, enzymes, and nucleic acids.

The composites of the present invention are particularly useful for producing conducting and semiconducting films (e.g., metals, metal oxides, metal nitrides, metal carbides, metal borides, polyacetylenes, polythiophenes, and polypyrroles) on the surfaces of halopolymers. More particularly, the conducting and semiconducting films are easier to dispose on the surfaces of the composites of the present invention than on the surfaces of halopolymer composites. Referring to FIG. 1, it has been observed that, when halopolymer 20 having free volume therein is evacuated and inorganic or organic materials are infused into halopolymer 20's evacuated free volume to produce halopolymer composite 22, the infused organic or inorganic materials reside in the bulk of halopolymer composite 22. It has also been observed that there exists thin layer 24 (typically from about 0.5 nm to about 3 nm thick) of halopolymer adjacent halopolymer composite 22's surface 26 that contains no infused inorganic or organic material. In many applications, it is important that the inorganic or organic layer be present directly at surface 26 of halopolymer composite 22 to provide a more compatible bonding environment to an adjacent conducting or semiconducting material (e.g., metal, metal oxide, metal nitride, metal carbide, metal boride, polyacetylene, polythiophene, and polypyrrole). In particular, semiconductor materials, such as metal oxides, metal nitrides, metal carbides, or metal borides, are currently synthesized, mixed, or coated with fluorine or fluoropolymers (e.g., PTFE or PVDF), because of the fluoropolymers' physical and chemical inertness and dielectric properties. See, for example, Kirschner, *Chemical and Engineering News*, 75(47):25 (Nov. 24, 1997), U.S. Pat. No. 5,602,491 to Vasquez et al., U.S. Pat. No. 5,491,377 to Janusauskas, U.S. Pat. No. 5,287,619 to Smith et al., U.S. Pat. No. 5,440,805 to Daigle et al., and U.S. Pat. No. 5,061,548 to Arthur et al., which are hereby incorporated by reference. However, it is also desirable to adhere layers or films of inorganic or organic materials (e.g., conducting, semiconducting, or luminescent materials) adjacent to the fluoropolymeric materials to provide a conducting or semiconducting layer on the semiconductor which has been synthesized, mixed, or coated with fluorine, or fluoropolymers. Similarly, where a halopolymer composite is substituted for the semiconductor materials which has been synthesized, mixed, or coated with fluorine or fluoropolymers, it may be desirable to adhere layers or films of inorganic or organic materials (e.g., conducting, semiconducting, or luminescent materials) adjacent to the halopolymer composite. For example, in some cases, it is desirable to bond the halopolymer composite in between conducting or semiconducting materials. However, referring again to FIG. 1, since it has been observed that the infused conducting or semiconducting material contained within halopolymer composite 22 lies from about 0.5 nm to about 3 nm below surface 26 of halopolymer composite 22, the infused material does not facilitate adhesion of the desired conducting or semiconducting material to surface 26 of halopolymer composite 22.

Figure 2:
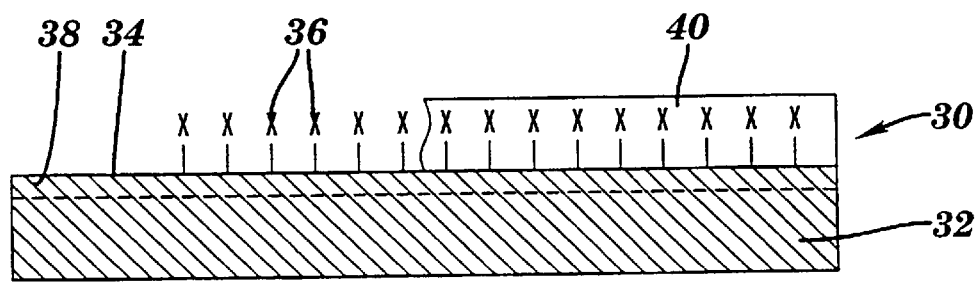
FIG. 2 is a diagram illustrating a cross-sectional view of an oxyhalopolymer composite of the present invention.

The composites of the present invention (i.e., the oxyhalopolymer composites or surface-oxyhalogenanted non-halopolymer composites of the present invention) and composites made in accordance with the methods of the present invention are completely infused in the bulk and, in some cases, contain a layer (from about 1 nm to about 1 mm thick) of pure conducting or semiconducting material (e.g., metal, metal oxide, metal nitride, metal carbide, metal boride, polyacetylenes, polythiophene, and polypyrrole) on the surface of the infused matrix. This is illustrated in FIG. 2. Oxyhalopolymer composite 30 includes halopolymer composite 32 on whose surface 34 is covalently bonded oxygen atoms or oxygen-containing groups 36, which, in FIG. 2, are designated X. The thin layer 38 (typically from about 0.5 nm to about 3 nm thick) adjacent surface 34 is also infused with inorganic or organic material, and, in some cases, layer 40 (from about 1 nm to about 1 mm thick) of pure conducting or semiconducting material is disposed on surface 34 of oxyhalopolymer composite 30. Thus, using the methods of the present invention, a composite having organic or inorganic material infused into the entire volume of the polymer matrix can be prepared. More particularly, the organic or inorganic material can extend from the surface of the polymer matrix and, optionally, from 1 nm to several mm above the surface of the polymer matrix.

The composites of the present invention serve particularly well as substrates for bonding conducting or semiconducting materials (e.g., metals, metal oxides, metal nitrides, metal carbides, metal borides, polyacetylenes, polythiophenes, and polypyrroles), other polymers (e.g., polyurethanes, polyimides, polyamides, polyphosphazenes, halopolymers, polyolefins, polyacrylates, and polyesters), biological materials (e.g., proteins, enzymes, nucleotides, antibodies, and antigens), and phosphorescent and fluorescent molecules commonly used in sensors and electroluminescent or liquid crystal based displays. This is illustrated in FIGS. 3 and 4.

Figure 3:
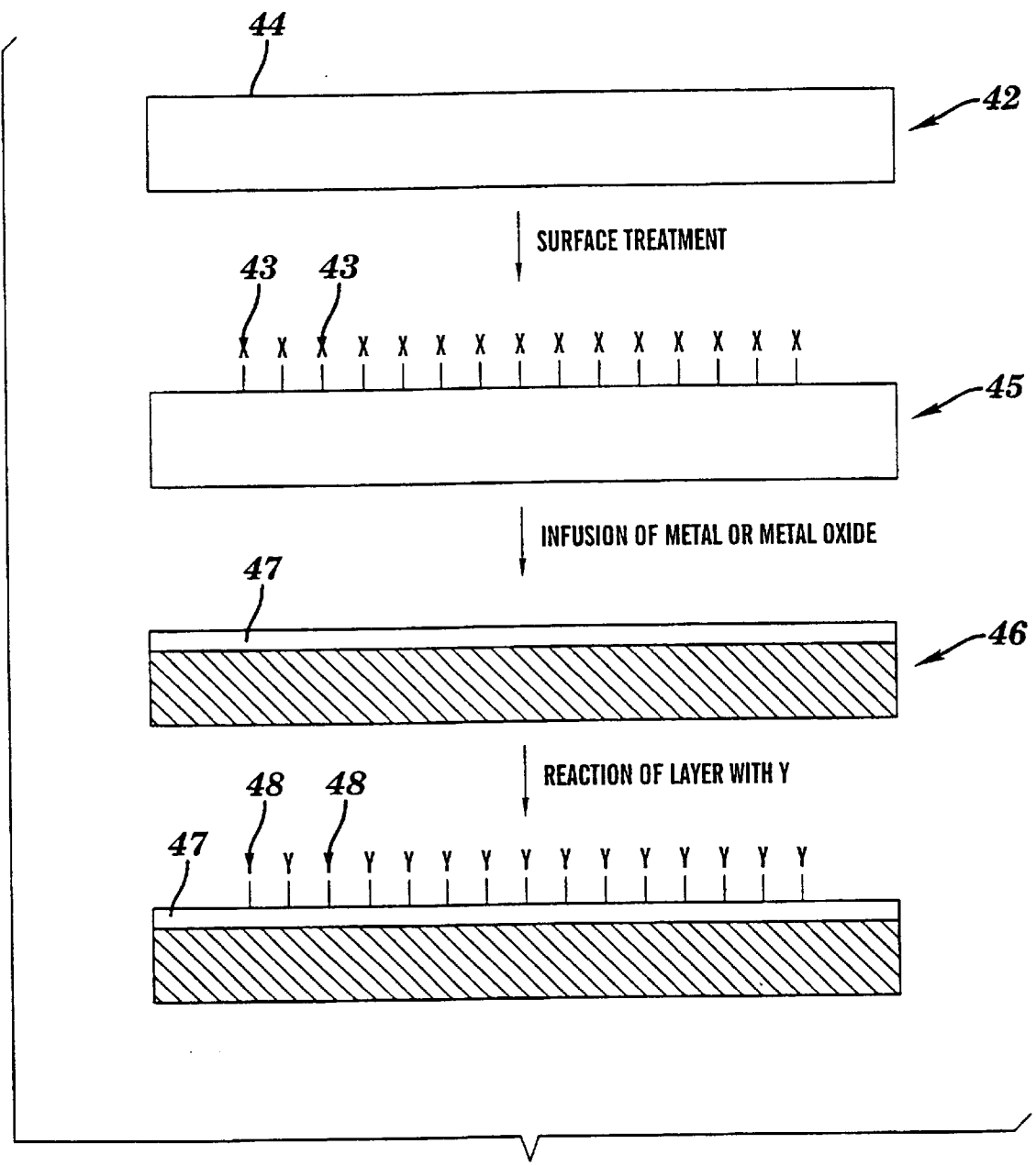
FIG. 3 is a preparative scheme for making an oxyhalopolymer composite in accordance with the present invention.
Figure 4:
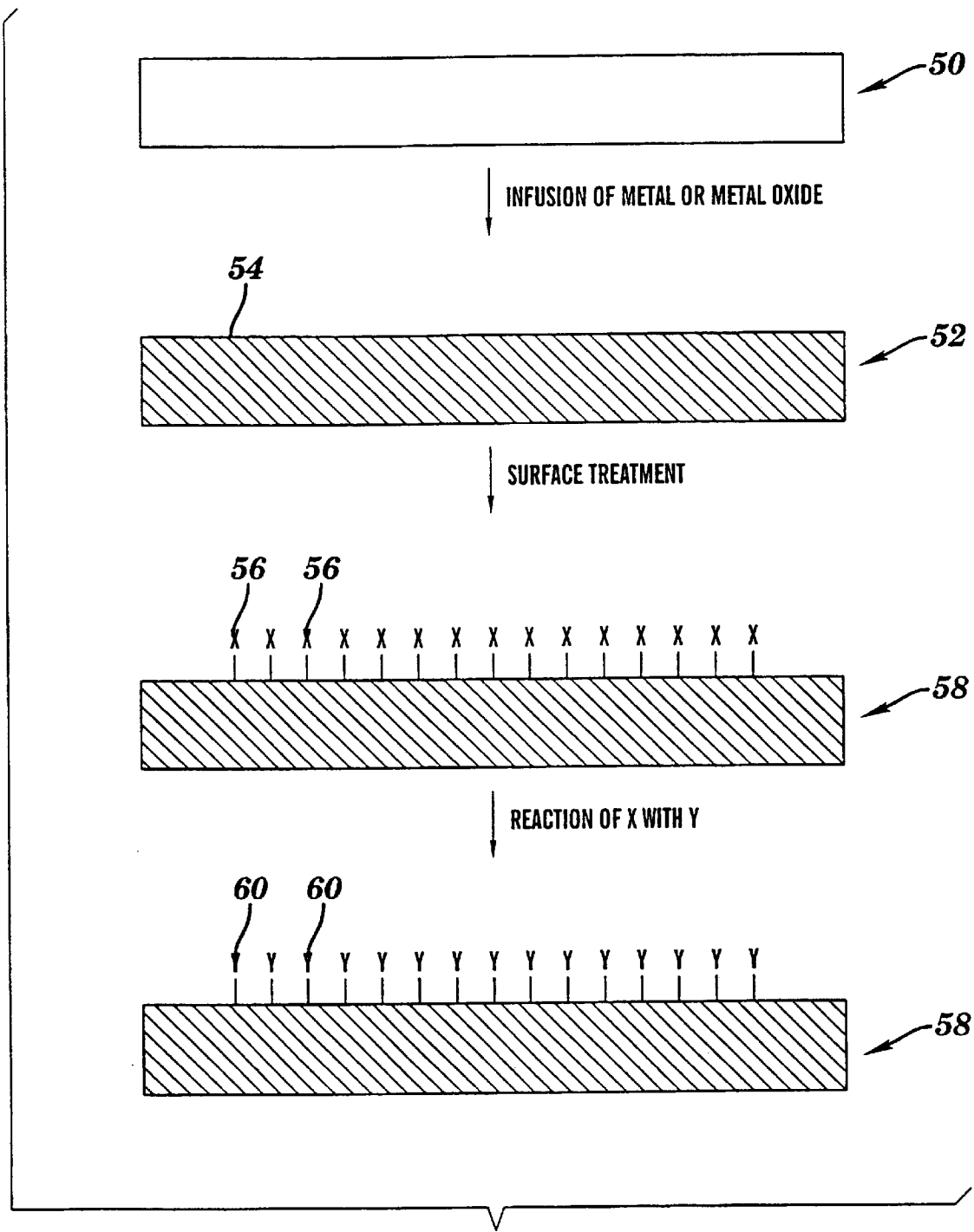
FIG. 4 is another preparative scheme for making an oxyhalopolymer composite in accordance with the present invention.

For example, in FIG. 3, halopolymer 42 is surface treated so that oxygen atoms or oxygen-containing radicals (designated X) 43 are bonded to surface 44, thus producing oxyhalopolymer 45. Oxyhalopolymer 45 is then infused with an organic or inorganic material to produce oxyhalopolymer composite 46. During the infusion process, layer 47 (from about 1 nm to about 1 mm thick) of pure conducting or semiconducting material (e.g., metal, metal oxide, metal nitride, metal carbide, metal boride, polyaceytlenes, polythiophene, and polypyrrole) is disposed on surface 44. Layer 47 of oxyhalopolymer composite 46 is then reacted with material (designated Y) 48 (e.g., conducting or semiconducting materials, other polymers, biological materials, and phosphorescent and fluorescent molecules commonly used in sensors and electroluminescent or liquid crystal based displays) so that material (designated Y) 48 is bonded to layer 47 of oxyhalopolymer composite 46.

Alternatively, in some cases, it may be desirable to bond materials directly to the oxyhalopolymer composite or surface-oxyhalogenated non-halopolymer composite of the present invention without having a thick layer of pure conducting or semiconducting material (e.g., metal, metal oxide, metal nitride, metal carbide, metal boride, polyaceytlenes, polythiophene, and polypyrrole) on the surface of the composite. This can be facilitated, for example, by using the scheme depicted in FIG. 4. In FIG. 4, halopolymer 50 is infused with an organic or inorganic material to produce halopolymer composite 52. Halopolymer composite 52 is then surface treated so that oxygen atoms or oxygen-containing radicals (designated X) 56 are bonded to surface 54 of halopolymer composite 52, thus producing oxyhalopolymer composite 58. oxyhalopolymer composite 58's surface oxygen atoms or oxygen-containing radicals (designated X) 56 are then reacted with material (designated Y) 60 (e.g., conducting or semiconducting materials, other polymers, biological materials, and phosphorescent and fluorescent molecules commonly used in sensors and electroluminescent or liquid crystal based displays) so that material (designated Y) 60 is bonded to oxyhalopolymer composite 58. By using the scheme depicted in FIG. 4, the thick bonding layer made of pure conducting or semiconducting material can be excluded from the resulting composite.

The composites of the present invention can be used to make electrical substrate materials well suited for forming rigid printed wiring board substrate materials and integrated circuit chip carriers, such as those described in U.S. Pat. No. 4,849,284 to Arthur et al. ("Arthur"), which is hereby incorporated by reference, by, for example, substituting the composites of the present invention for the ceramic filled fluoropolymer set forth in Arthur.

The composites of the present invention can be used to make materials which exhibit low loss, and high dielectric constants and which have acceptable thermal coefficients of dielectric constants, such as those described in U.S. Pat. No. 5,358,775 to Horn, III ("Horn"), which is hereby incorporated by reference, by, for example, substituting the composites of the present invention for the ceramic filled fluoropolymers set forth in Horn.

The composites of the present invention can be used to make solid polymer type fuel cells, such as those described in U.S. Pat. No. 5,474,857 to Uchida et al. ("Uchida"), which is hereby incorporated by reference, by, for example, substituting the composites of the present invention for the solid polymer electrolyte set forth in Uchida.

The composites of the present invention can be used to make coverlay films suitable for use in the making printed circuit boards, such as those described in U.S. Pat. No. 5,473,118 to Fukutake et al. ("Fukutake"), which is hereby incorporated by reference, by, for example, substituting the composites of the present invention for the fluoropolymer film (which is subsequently coated with a thermoplastic or heat-curing adhesive) set forth in Fukutake.

The composites of the present invention can be used in manufacturing multilayer circuit assemblies, such as by the methods described in U.S. Pat. No. 5,440,805 to Daigle et al. ("Daigle"), which is hereby incorporated by reference, by, for example, substituting the composites of the present invention for the fluoropolymer composite materials set forth in Daigle.

The composites of the present invention can be used in making multichip module substrates, such as those described in U.S. Pat. No. 5,287,619 to Smith et al. ("Smith"), which is hereby incorporated by reference, by, for example, substituting the composites of the present invention for the fluoropolymer composite materials set forth in Smith.

The composites of the present invention can be used in making electroluminescent lamps, such as those described in U.S. Pat. No. 5,491,377 to Janusauskas ("Janusauskas"), which is hereby incorporated by reference, by, for example, substituting the composites of the present invention for the fluoropolymer binder set forth in Janusauskas.

The composites of the present invention can be in freestanding form (i.e., not attached to another material). Examples of composites in freestanding form include composite beads, composite particles, composite films, composite fibers, composite filaments, composite powders, and the like. Alternatively, the composites of the present invention can be disposed on a base material (e.g., a halopolymer, a non-halopolymer, a ceramic, a glass, a metal, and a metal oxide). For example, pure metal oxide substrates that are coated with composites (particularly oxyfluoropolymer composites) of the present invention (particularly those having a metal oxide surface and metal oxides disposed in the free volumes thereof that are coated onto pure metal oxide) are particularly useful in the semiconductor industry.

Oxyhalopolymer composites of the present invention disposed on a base material can be prepared, for example, by coating, adhering, or otherwise disposing a halopolymer on the base material and then modifying the surface with oxygen or oxygen-containing radicals and, prior to, during, or subsequent to said modifying, evacuating the free volume and infusing an inorganic or organic material thereinto. Alternatively, oxyhalopolymer composites of the present invention disposed on a base material can be prepared by coating, adhering, or otherwise disposing a halopolymer composite on the base material and then modifying the halopolymer composite's surface with oxygen or oxygen-containing radicals. Still alternatively, oxyhalopolymer composites of the present invention disposed on a base material can be prepared by coating, adhering, or otherwise disposing an oxyhalopolymer on the base material and then evacuating the oxyhalopolymer's free volume and infusing an inorganic or organic material thereinto. Still alternatively, oxyhalopolymer composites of the present invention disposed on a base material can be prepared by coating, adhering, or otherwise disposing an oxyhalopolymer composite on the base material.

Surface-oxyhalogenated non-halopolymer composites of the present invention disposed on a base material can be similarly prepared, for example, by any of the methods described above for preparing oxyhalopolymers disposed on base materials.

The present invention is further illustrated by the following examples.

EXAMPLES

Example 1

Modification of FEP Before and After Infusion of FEP With $SiCl_4$

Modified FEP. FEP was modified using a $H_2$/MeOH plasma as described hereinabove. For this experiment the FEP was modified using a 90 second exposure which results in a nominally modified material (i.e., only 2.8% oxygen and about a 3:1 ratio between the $C-F_2$ and the modified $C-OH$ functionality measured and observed in the ESCA carbon is region).

Modified FEP+SiCl4 Infusion. This sample was produced using a 90 second radio frequency glow discharge comprised of $H_2$ and MeOH as described hereinabove as the preferred method of modification. The infusion was carried out by placing a 4 cm×6 cm, 2 mil thick film of the modified FEP into an evacuated vessel containing approximately 1.0 g of $SiCl_4$ evacuated to less than 10 mTorr and reacting for 1 hr at room temperature. After removing the FEP sample from the infusion vessel the FEP was ultrasonically cleaned in $H_2O$ for 30 min to both hydrolyze the $SiCl_4$ to the polycondensate (e.g., $-(SiO_x-O-SiO_x)-$) and to eliminate any of the formed silicate not covalently bonded to the surface or not permanently infused into the material. Subsequent analysis by ESCA showed that the surface had 1.8% silicon and that the oxygen % increased from 2.8% (measured on the modified non-infused FEP) to 7.2%. These results indicate that the silicate was both formed not only within the bulk but also, unexpectedly, at the surface. Table 2 lists the ESCA results for the unmodified FEP infused with $SiCl_4$. When infusion was carried out on unmodified FEP only, 0.3% Si and 2.2% oxygen were measured at the FEP surface. Thus, by first modifying the FEP, one can obtain not only a fluoropolymer having bulk infused metal oxide but also a material having an overcoating of the silicate (metal oxide) at the interface of the FEP material. This silicate overcoating is useful for bonding metals, metal oxides, polymers, biological molecules, and phosphorescent and/or luminescent materials.

Inspection by X-ray Photo-Electron Spectroscopy (ESCA or XPS) of the oxygen is region of the infused modified FEP showed two bands: one at ca. 536.5 and one at ca. 533.5. The 533.5 band corresponds to the surface residing silicate. The band observed at ca. 536.5 is unusually high and is indicative of the oxide of the silicate contained within the infused highly electronegative FEP bulk. This is consistent with the Si2p ESCA results which show only one band centered at ca. 102.8 eV, which is consistent with what one would observe for a silicate. Combining these results indicates that the species of silicate formed both within and at the interface of the fluoropolymer are the same in chemical nature but that the silicate formed within the fluoropolymer matrix is influenced by the surrounding fluoropolymer electronegativity which results in a bulk and surface silicate having different electronic characteristics.

Unmodified FEP Infused with $SiCl_4$. Unmodified FEP was infused with SiCl4 using the identical conditions described above for the infusion of $SiCl_4$ into modified FEP. The subsequent hydrolysis of the $SiCl_4$ to the silicate takes place, and, as can be observed from Table 2, only a very small concentration of the silicate is observed at the interface. The only observation made on this material pertains to the oxygen is region of the ESCA spectrum, which shows the bands at 536.5 and 533.5. The bands at 536.5 and 533.5 are consistent with the previous discussion which explains these two distinct ESCA oxygen 1s bands as being similar in chemical nature (i.e., a silicate oxide) but different in electronic nature (due to silicate residing in the bulk of the fluoropolymer versus the silicate residing on the surface of the FEP). These results are similar to those reported for the silicate infused modified FEP material as described above except that the band associated with the oxygen present at the surface is much larger in the case where the infused FEP was first modified. This is consistent with the results above which demonstrate the desirability of modifying the fluoropolymer surface to obtain a coating of silicon oxide above the surface of the fluoropolymer.

TABLE 2

| Sample | % Fluorine | % Carbon | % Silicon | % Oxygen |
|---|---|---|---|---|
| Modified FEP (90 sec RFGD) | 58.0 | 39.2 | — | 2.8 |
| Modified FEP + $SiCl_4$ Infusion | 55.5 | 35.5 | 1.8 | 7.2 |
| Unmodified FEP infused with $SiCl_4$ | 64 | 33.4 | 0.3 | 2.2 |
| FEP Infused with $SiCl_4$ + 2 min RFGD | 46.3 | 46.7 | 0.1 | 6.9 |

Example 2

Infusion Into Modified and Unmodified Fluoropolymers

The results listed in Table 3 illustrate that infusion of metals and metal oxides, (as demonstrated in this example using $SiCl_4$) into the bulk of halopolymers can be effected so that by first modifying the surface layer of the halopolymer one can achieve the bonding of the infused metal or metal oxide material not only within the bulk but at the surface of the halopolymer as well. This is further demonstrated by ESCA (or XPS) results which show more than two forms of oxygen and silicon at the surface of these materials. Because the sampling depth of the ESCA experiment allows one to observe molecular and polymeric species both at the surface as well as in the interfacial bulk of any inspected material, one can discern the differences in material lying within the bulk and at the air interface. Accordingly, the experiments above show multiple spectroscopic bands for both the oxygen is and the silicon 2p functionality as observed in the materials which have been infused. Essentially, the modified materials exhibit only one oxygen band related to the incorporation of oxygen due to the surface modification achieved using the $H_2$/MeOH RFGD modification (except in the case of the MFA material, which initially includes an oxygen functionality due to the perfluoroalkoxy functionality included within its polymeric structure). Upon infusion of $SiCl_4$, and its subsequent hydrolysis to a silicate material, at least one other oxygen band by ESCA (in some cases more than one) was observed. These extra bands are believed to be due to the formation of silicon oxides of different structures within the polymer as well as the silicon oxide formed at the surface. For example, a silicon oxide within the bulk material may be directly influenced by the electronegative characteristics of the electron withdrawing halogen functionality, thus giving it a different binding energy relative to the one measured from the silicon oxide species covalently attached and proliferated at the surface of the active oxidized halogenated polymer. This is demonstrated in following examples as well which show the difference between infusion of non-surface modified halopolymers versus infusion of halopolymers which have been previously modified to include surface reactive oxygen functionalities.

TABLE 3

| Sample | % Carbon | % Oxygen | % Fluorine | % Silicon | % Chlorine |
|---|---|---|---|---|---|
| PTFE modified | 34.3 | 2.0 | 63.7 | N/A | N/A |
| PTFE modified plus $SiCl_4$ infusion | 34.2 | 10.1 | 52.9 | 2.8 | N/A |
| MFA modified | 36.0 | 3.6 | 60.4 | N/A | N/A |
| MFA modified plus $SiCl_4$ infusion | 28.2 | 28.1 | 34.5 | 9.2 | N/A |
| ECTFE modified | 69.8 | 9.0 | 19.3 | N/A | 1.8 |
| ECTFE plus $SiCl_4$ infusion | 43.0 | 33.1 | 13.8 | 9.0 | 1.1 |

Example 3

Modified ECTFE and Unmodified ECTFE Infused With $SiCl_4$

ESCA results of infusing $SiCl_4$ into both modified and unmodified ECTFE indicate that the atomic percent of surface residing Si (which is related to the concentration of surface metal oxide) is greater in the case when the ECTFE material is modified versus the unmodified ECTFE material. Specifically, the % silicon (strictly due to the silicon oxide) increases from 2.5% to 9.0% in the case where the ECTFE material was first modified. Correspondingly, the oxygen % increases from 8.9% to 33.1% (again the increase is observed on the ECTFE material), indicating a large increase in surface residing silicon oxide which is due to the effect of initially modifying the ECTFE which results in an overcoating of covalently bonded silicon oxide to the modified ECTFE surface. This overcoating is not observed to the same extent on the unmodified ECTFE infused material.

Example 4

Unmodified and Surface Modified Halopolymers Infused With $TiCl_4$

A variety of surface modified and unmodified halopolymers were infused with $TiCl_4$ and then hydrolyzed to form nanoscale networks of titanium oxide material in the bulk of the halopolymers as well as at the surface of the modified halopolymers. The infusion process was carried out by placing films of the halopolymers into a glass vessel, evacuating the vessel to ca 10 mTorr or less, then introducing $TiCl_4$ into the evacuated vessel, and then heating the vessel to 90° C. After 1 hr, the halopolymer films were removed to ambient air and then first ultrasonically washed in distilled $H_2O$ for 30 min and then ultrasonically washed in MeOH for 30 min.

ESCA analysis was performed on these halopolymer films, and the results were obtained from three different halopolymer films, namely, PTFE, MFA, and ECTFE. For each material, data were collected from two separate films: one which was infused without prior surface modification and one which was infused after a $H_2$/MeOH RFGD surface modification.

Infusion of Modified and Unmodified PTFE. The modified PTFE was prepared using a 4 min exposure time to a $H_2$/MeOH RFGD plasma as described hereinabove as the preferred method of halopolymer surface modification. ESCA results showed that the % of titanium measured on the surface of these materials increased from 0.25% (measured on the non-surface modified PTFE) to 0.60 (measured on the surface modified PTFE). The % oxygen due to the titanium oxide increased from 4.1% (measured on the non-surface modified PTFE) to 7.8% (measured on the surface modified PTFE). These results indicate the desirability of first modifying the PTFE surface in order to extend the growth of titanium oxide (formed within the bulk of the PTFE) out of the bulk and onto the PTFE surface. ESCA results also reveal the presence of two oxygen bands (one at 536.4 eV due to the oxide contained in the bulk and one at 532.0 eV due to the surface residing oxide) and two titanium bands (one at 459.9 eV due to bulk titanate and one at 456.2 eV due to surface residing titanate). As discussed previously, the observation of two oxygen and two titanium bands is indicative of the formation of titanium oxide in the bulk which is heavily influenced by the PTFE electronegative functionality and the formation of titanium oxide out of the bulk such that it exists as a homogeneous material which has different electronic characteristics which give rise to oxygen and titanium ESCA signals significantly different than those of the titanium oxide material residing in the PTFE bulk.

Infusion of Modified and Unmodified MFA. The modified MFA was prepared using a 3 min exposure time to a $H_2$/MeOH RFGD plasma as described hereinabove as the preferred method of halopolymer surface modification. ESCA results showed that the % of titanium measured on the surface of these materials increased five-fold from 0.20% (measured on the non-surface modified MFA) to 1.00 (measured on the surface modified MFA). The % oxygen due to the titanium oxide increased from 8.9% (measured on the non-surface modified MFA) to 10.25% (measured on the surface modified MFA). These results indicate the desirability of first modifying the MFA surface in order to extend the growth of titanium oxide (formed within the bulk of the MFA) out of the bulk and onto the MFA surface. ESCA results also reveal the presence of three oxygen bands (one at 536.1 eV due to the titanium oxide contained in the bulk, a second at 533.4 eV due to the perfluoroalkoxy functionality contained within the MFA material, and a third at 531.4 eV due to the surface residing titanium oxide) and two titanium bands (one at 459.4 eV due to bulk titanate and one at 455.7 eV due to surface residing titanate). As discussed previously, the observation of two oxygen and two titanium bands is indicative of the formation of titanium oxide in the bulk which is heavily influenced by the MFA electronegative functionality and the formation of titanium oxide out of the bulk such that it exists as a homogeneous material which has different electronic characteristics which give rise to oxygen and titanium ESCA signals significantly different than those of the titanium oxide material residing in the MFA bulk.

Infusion of Modified and Unmodified ECTFE. The modified ECTFE was prepared using a 90 sec exposure time to a $H_2$/MeOH RFGD plasma as described hereinabove as the preferred method of halopolymer surface modification. ESCA results showed that the % of titanium measured on the surface of these materials increased two-fold from 0.50% (measured on the non-surface modified ECTFE) to 1.00 (measured on the surface modified ECTFE). The % oxygen due to the titanium oxide increased from 4.3% (measured on the non-surface modified ECTFE) to 10.90% (measured on the surface modified ECTFE). These results indicate the desirability of first modifying the ECTFE surface in order to extend the growth of titanium oxide (formed within the bulk of the ECTFE) out of the bulk and onto the ECTFE surface. ESCA results also reveal the presence of two oxygen bands (one at 534.7 eV due to the titanium oxide contained in the bulk and another at 531.1 eV due to the surface residing titanium oxide) and two titanium bands (one at 457.2 eV due to the bulk titanate and another at 455.2 eV due to surface residing titanate). As discussed previously, the observation of two oxygen and two titanium bands is indicative of the formation of titanium oxide in the bulk which is heavily influenced by the ECTFE electronegative functionality and the formation of titanium oxide out of the bulk such that it exists as a homogeneous material which has different electronic characteristics which give rise to oxygen and titanium ESCA signals significantly different than those of the titanium oxide material residing in the ECTFE bulk.

Example 5

Infusion of Polymers for Decreasing the Permeability of Liquids and Gases

In many cases, it is useful to decrease the permeation of liquids and gases through polymeric materials. For example, U.S. Pat. No. 5,298,291 to Klinger et al., which is hereby incorporated by reference, describes an epoxy-functional fluoropolyol polyacrylate coating of optical fibers as being useful as a moisture inhibitor and for inhibiting permeation of water through the polymeric network, thus preventing moisture-induced corrosion of the underlying fiberoptic material. As another example, U.S. Pat. No. 5,320,888 to Stevens, which is hereby incorporated by reference, describes laminates of fluoroelastomers, non-elastomeric fluoropolymers, and non-fluorinated elastomers as being both flexible and useful for inhibiting the permeation of fuel. The composites of the present invention and composites made in accordance with the methods of the present invention are believed to be useful in inhibiting permeation of both gases and liquids. Both halopolymers (including elastomeric and non-elastomeric halopolymers) and non-halopolymers can be infused with metals and/or metal oxides, which can act to fill the free volumes of the halopolymers or non-halopolymers, thus increasing the polymer's density and blocking the permeation of both gases and liquids. The degree to which permeation of gases and liquids is inhibited can be controlled by the choice of metal and/or metal oxide and by the extent to which the metal and/or metal oxide is grown within the free volume within the halopolymer or non-halopolymer.

For example, 0.1 g of $TaF_5$ was placed into a glass vessel containing a halopolymer film of ECTFE, which film had a density of 1.26 g/cm$^3$. The vessel was evacuated to a pressure of less than 10 mTorr and then heated to ca. 150° C. After 1 hr, the film was removed from the vessel and ultrasonicated in distilled $H_2O$ for 30 min and then ultrasonicated in MeOH for 30 min. After the sample was dried, it was weighed and the density was calculated to be 1.51 g/cm$^3$. Thus the formation of tantalum oxide resulted in an increase in density of 16%. Measurements of the amount of $TaO_x$ showed that the amount of $TaO_x$ added to the ECTFE film was approximately 2% by weight with the corresponding increase in density to be 16%. This material is expected to show significant decreases in gas and liquid permeability based on the measured increase in film density.

Alternatively, several grams of ECTFE powder (having diameters between 1 micron and 10 microns) were reacted with $TaF_5$ in the same way as described above for the ECTFE film. After infusion of $TaF_5$, the $TaF_5$ was converted to $TaO_x$ by hydrolysis. The powder is believed to be useful for coating objects either by thermally spraying or plasma spraying. The sprayed coating will have the same properties as that of the infused ECTFE film and will result in a coating having decreased gas and liquid permeability characteristics as compared to a sprayed coating of ECTFE which was not infused with $TaO_x$.

Additionally, the infused ECTFE powder can be surface modified either before or after infusion using any of the methods described herein (preferably the $H_2$/MeOH RFGD plasma treatment method) in order to provide surface wettability and/or good adhesion characteristics. These surface modified infused powders can then be used to coat other materials, for example by thermal or plasma spray techniques or (since the surface is more wettable and adhesive) through mixing of the powders into paints, lacquers, or other resins which can be applied, for example, by rolling, brushing, or spraying.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An oxyhalopolymer composite comprising:
   an oxyhalopolymer having free volume therein; and
   an inorganic or organic material disposed in the free volume of said oxyhalopolymer.

2. A surface-oxyhalogenated non-halopolymer composite comprising:
   a surface-oxyhalogenated non-halopolymer having free volume therein; and
   an inorganic or organic material disposed in the free volume of said surface-oxyhalogenated non-halopolymer.

3. A surface-oxyhalogenated non-halopolymer composite according to claim 2, wherein said surface-oxyhalogenated non-halopolymer comprises a non-halopolymer having a surface that is modified with a halocarbon or halohydrocarbon film, wherein both the non-halopolymer and the halocarbon or halohydrocarbon film have free volumes therein, and wherein the inorganic or organic material is disposed in the free volume of the non-halopolymer and in the free volume of the halocarbon or halohydrocarbon film.

4. An oxyhalopolymer composite according to claim 1, wherein the oxyhalopolymer is at least partially amorphous and wherein the free volume is a natural free volume.

5. An oxyhalopolymer composite according to claim 4, wherein the natural free volume contains substantially no carrier liquid.

6. An oxyhalopolymer composite according to claim 4, wherein the natural free volume is defined by free volume surfaces and wherein said inorganic or organic material is present as a layer on or along the free volume surfaces.

7. An oxyhalopolymer composite according to claim 4, wherein said inorganic or organic material is an inorganic or organic macromolecular network.

8. An oxyhalopolymer composite according to claim 7, wherein said inorganic or organic material is an inorganic macromolecular network.

9. An oxyhalopolymer composite according to claim 8, wherein the inorganic macromolecular network has the formula $[X(O)_n—O_y—X(O)_n]_m$, wherein m is an integer from about 1 to about 10,000; X represents a metal ion having a charge of +s; s is an integer from 1 to the metal's highest attainable oxidation state; y is an integer from 0 to s; and n is between zero and s/2.

10. An oxyhalopolymer composite according to claim 4, wherein said inorganic or organic material is metal network containing a Group IIIa, IVa, Va, VIa, or VIIa metal or a metal selected from the group consisting of Fe, Ru, Os, Co, Rh, Ir, Ni, Pd, and Pt.

11. An oxyhalopolymer composite according to claim 7, wherein said inorganic or organic material is an organic macromolecular network.

12. An oxyhalopolymer composite according to claim 11, wherein the organic macromolecular network has the formula $-(R—R-)_n$, wherein n is an integer from about 1 to about 10,000 and R is a monomer radical.

13. An oxyhalopolymer composite according to claim 11, wherein the organic macromolecular network comprises polyacetylene, polypyrrole, polyaniline, polythiophene, or combinations thereof.

14. An oxyhalopolymer composite according to claim 4, wherein said inorganic or organic material is an inorganic material comprising a metal selected from the group consisting of V, W, Fe, Ti, Si, Al, P, Sb, As, Ba, B, Cd, Ca, Ce, Cs, Cr, Co, Cu, Ga, Ge, In, Pb, Mg, Hg, Mo, Ni, Nb, Re, Ta, Tl, Sn, Ir, Rh, Th, Ru, Os, Pd, Pt, Zn, Au, Ag, and combinations thereof.

15. A surface-oxyhalogenated non-halopolymer composite according to claim 2, wherein the surface-oxyhalogenated non-halopolymer is at least partially amorphous and wherein the free volume is a natural free volume.

16. A surface-oxyhalogenated non-halopolymer composite according to claim 15, wherein the natural free volume contains substantially no carrier liquid.

17. A surface-oxyhalogenated non-halopolymer composite according to claim 15, wherein the natural free volume is defined by free volume surfaces and wherein said inorganic or organic material is present as a layer on or along the free volume surfaces.

18. A surface-oxyhalogenated non-halopolymer composite according to claim 15, wherein said inorganic or organic material is an inorganic or organic macromolecular network.

19. A surface-oxyhalogenated non-halopolymer composite according to claim 18, wherein said inorganic or organic material is an inorganic macromolecular network.

20. A surface-oxyhalogenated non-halopolymer composite according to claim 18, wherein the inorganic macromolecular network has the formula $[X(O)_n—O_y—X(O)_n]_m$, wherein m is an integer from about 1 to about 10,000; X represents a metal ion having a charge of +s; s is an integer from 1 to the metal's highest attainable oxidation state; y is an integer from 0 to s; and n is between zero and s/2.

21. A surface-oxyhalogenated non-halopolymer composite according to claim 15, wherein said inorganic or organic material is metal network containing a Group IIIa, IVa, Va, VIa, or VIIa metal or a metal selected from the group consisting of Fe, Ru, Os, Co, Rh, Ir, Ni, Pd, and Pt.

22. A surface-oxyhalogenated non-halopolymer composite according to claim 18, wherein said inorganic or organic material is an organic macromolecular network.

23. A surface-oxyhalogenated non-halopolymer composite according to claim 22, wherein the organic macromolecular network has the formula $-(R—R-)_n$, wherein n is an integer from about 1 to about 10,000 and R is a monomer radical.

24. A surface-oxyhalogenated non-halopolymer composite according to claim 22, wherein the organic macromolecular network comprises polyacetylene, polypyrrole, polyaniline, polythiophene, or combinations thereof.

25. A surface-oxyhalogenated non-halopolymer composite according to claim 15, wherein said inorganic or organic material is an inorganic material comprising a metal selected from the group consisting of V, W, Fe, Ti, Si, Al, P, Sb, As, Ba, B, Cd, Ca, Ce, Cs, Cr, Co, Cu, Ga, Ge, In, Pb, Mg, Hg, Mo, Ni, Nb, Re, Ta, Tl, Sn, Ir, Rh, Th, Ru, Os, Pd, Pt, Zn, Au, Ag, and combinations thereof.

26. A method for making an oxyhalopolymer composite according to claim 1, said method comprising:
providing an oxyhalopolymer having free volume therein;
evacuating the free volume of the oxyhalopolymer; and
infusing inorganic or organic molecules into the evacuated free volume of the oxyhalopolymer.

27. A method according to claim 26, wherein said providing the oxyhalopolymer comprises:
providing a halopolymer; and
modifying the halopolymer's surface halogen atoms under conditions effective to substitute at least a portion of the halopolymer's surface halogen atoms with hydrogen atoms and oxgen atoms or oxygen-containing radicals.

28. A method according to claim 27, wherein the halopolymer's surface halogen atoms are modified by radio frequency glow discharge of a gas-vapor under vacuum comprising:
contacting the halopolymer with a gas/vapor plasma mixture while exposing the halopolymer to at least one radio frequency glow discharge under vacuum and under conditions effective to substitute at least a portion of the halopolymer's surface halogen atoms are modified by radio hydrogen atoms and oxgen atoms or oxygen-containing radicals.

29. A method for making an oxyhalopolymer composite according to claim 1, said method comprising:
providing a halopolymer composite; and
modifying the halopolymer composite's surface. halogen atoms under conditions effective to substitute at least a portion of the halopolymer composite's surface halogen atoms with hydrogen atoms and oxygen atoms or oxygen-containing radicals.

30. A method according to claim 29, wherein said providing the halopolymer composite comprises:
providing a halopolymer having free volume therein;
evacuating the free volume of the halopolymer; and
infusing inorganic or organic molecules into the evacuating free volume of the halopolymer.

31. A method according to claim 29, wherein the halopolymer composite's surface halogen atoms are modified by radio frequency glow discharge of a gas-vapor under vacuum comprising:
contacting the halopolymer composite with a gas/vapor plasma mixture while exposing the halopolymer composite to at least one radio frequency glow discharge under vacuum and under conditions effective to substitute at least a portion of the halopolymer composite's surface halogen atoms with covalently bonded hydrogen atoms and oxygen atoms or oxygen-containing radicals.

32. A method for making a surface-oxyhalogenated non-halopolymer composite according to claim 19, said method comprising:
providing a surface-oxyhalogenated non-halopolymer having free volume therein;
evacuating the free volume of the surface-oxyhalogenated non-halopolymer; and
infusing inorganic or organic molecules into the evacuted free volume of the surface-oxyhalogenated non-halopolymer.

33. A method according to claim 32, wherein said providing the surface-oxyhalogenated non-halopolymer comprises:
providing a surface-halogenated non-halopolymer having free volume therein; and
modifying the surface-halogenated non-halopolymer's surface halogen atoms under conditions effective to substitue at least a portion of the surface-halogenated non-halopolymer's surface halogen atoms with hydrogen atoms and oxygen atoms or oxygen-containing radicals.

34. A method according to claim 33, wherein said providing a surface-halogenated non-halopolymercomprises:
providing a non-halopolymer having free volume therein; and
contacting the non-halopolymer's surface with halogen atoms or a halocarbon or halohydrocarbon film under the halocarbon or halohydrocarbon film to the non-halopolymer's surface.

35. A method according to claim 33, wherein the surface-halogenated non-halopolymer's surface halogen atoms are modified by radio frequency glow discharge of a gas-vapor under vacuum comprising:
contacting the surface-halogenated non-halopolymer with a gas/vapor plasma mixture while exposing the surface-halogenated non-halopolymer to at least one radio frequency glow discharge under vacuum and under conditions effective to substitute at least a portion of the surface-halogenated non-halopolymer's surface halogen atoms with covalently bonded hydrogen atoms and oxygen atoms or oxygen-containing radicals.

36. A method according to claim 32, wherein the surface-oxyhalogenated non-halopolymer comprises a non-halopolymer having a surface that is modified with a halocarbon or halohydrocarbon film, wherein both of the non-halopolymer and the halocarbon or halohydrocarbon film have free volumes therein, and wherein said method further comprises:
evacuating the free volume of the halocarbon or halohydrocarbon film; and
infusing inorganic or organic molecules into the evacuated free volume of the halocarbon or halohydrocarbon film.

37. A method for making a surface-oxyhalogenated non-halopolymer composite according to claim 2, said method comprising:
providing a surface-halogenated non-halopolymer composite; and
modifying the surface-halogenated non-halopolymer composite's surface halogen atoms under conditions effective to substitute at least a portion of the surface-halogenated non-halopolymer composite's surface halogen atom with hydrogen atoms and oxygen atoms or oxygen-containing radicals.

38. A method according to claim 37, wherein said providing a surface-halogenated non-halopolymer composite comprises:
providing a surface-halogenated non-halopolymer having free volume therein;
evacuating the free volume of the surface-halogenated non-halopolymer; and
infusing inorganic or organic molecules into the evacuated free volume of the surface-halogenated non-halopolymer.

39. A method according to claim 37, wherein the surface-halogenated non-halopolymer comprises a non-halopolymer having a surface that is modified with a halocarbon or halohydrocarbon film, wherein both of the non-halopolymer and the halocarbon or halohydrocarbon film have free volumes therein, and wherein said method further comprises:

evacuating the free volume of the halocarbon or halohydrocarbon film; and infusing inorganic or organic molecules into the evacuated free volume of the halocarbon or halohydrocarbon film.

40. A method according to claim 37, wherein said providing a surface-halogenated non-halopolymer composite comprises:

providing a non-halopolymer composite; and contacting the non-halopolymer composite's surface with halogen atoms or a halocarbon or halohydrocarbon film under conditions effective to molecuarly bond the halogen atoms or the halocarbon or halohydrocarbon film to the non-halopolymer composite's surface.

41. A method according to claim 40, wherein said providing a non-halopolymer composite comprises:

providing a non-polymer having free volume therein;

evacuating the free volume of the non-halopolymer; and infusing inorganic or organic molecules into the evacuated free volume of the non-halopolymer.

42. A method according to claim 37, wherein the surface-halogenated non-halopolymer composite's surface halogen atoms are modified by radio frequency glow discharge of a gas-vapor under vacuum comprising:

contacting the surface-halogenated non-halopolymer composite with a gas/vapor plasma mixture while exposing the surface-halogenated non-halopolymer composite to at least one radio frequency glow discharge under vacuum and under conditions effective to substitute at least a portion of the surface-halogenated non-halopolymer composite's surface halogen atoms with covalently bonded hydrogen atoms and oxygen atoms or oxygen-containing radicals.

* * * * *